United States Patent [19]
Hasbun et al.

[11] Patent Number: 5,937,434
[45] Date of Patent: Aug. 10, 1999

[54] METHOD OF MANAGING A SYMMETRICALLY BLOCKED NONVOLATILE MEMORY HAVING A BIFURCATED STORAGE ARCHITECTURE

[75] Inventors: Robert N. Hasbun, Shingle Springs; David A. Edwards, Orangevale; Andrew H. Gafken, Folsom, all of Calif.

[73] Assignee: Intel Corporation, Santa Clara, Calif.

[21] Appl. No.: 08/801,781

[22] Filed: Feb. 14, 1997

[51] Int. Cl.[6] ........................................... G06F 12/02
[52] U.S. Cl. .................. 711/170; 711/171; 711/172; 711/173; 711/156; 711/165
[58] Field of Search ..................... 711/100, 101, 711/102, 103, 170, 173, 156, 165, 171, 172

[56] References Cited

U.S. PATENT DOCUMENTS

| | | | |
|---|---|---|---|
| 4,758,944 | 7/1988 | Bartley et al. | 711/171 |
| 4,849,878 | 7/1989 | Roy | 707/200 |
| 5,297,148 | 3/1994 | Harari et al. | 371/10.2 |
| 5,404,485 | 4/1995 | Ban | 711/202 |
| 5,437,020 | 7/1995 | Wells et al. | 395/182.04 |
| 5,519,831 | 5/1996 | Holzhammer | 395/182.2 |
| 5,519,843 | 5/1996 | Moran et al. | 711/103 |
| 5,530,673 | 6/1996 | Tobita et al. | 365/185.09 |
| 5,535,357 | 7/1996 | Moran et al. | 711/103 |
| 5,535,369 | 7/1996 | Wells et al. | 711/171 |
| 5,544,356 | 8/1996 | Robinson et al. | 707/205 |
| 5,563,828 | 10/1996 | Hasbun et al. | 365/185.33 |
| 5,596,738 | 1/1997 | Pope | 711/103 |
| 5,602,987 | 2/1997 | Harari et al. | 395/182.06 |
| 5,603,056 | 2/1997 | Totani | 395/828 |
| 5,671,388 | 9/1997 | Hasbun . | |
| 5,680,570 | 10/1997 | Rantala et al. . | |
| 5,701,492 | 12/1997 | Wadsworth et al. . | |
| 5,717,886 | 2/1998 | Miyauchi | 711/103 |
| 5,737,742 | 4/1998 | Achiwa et al. . | |

OTHER PUBLICATIONS

"A TrueFFS and FLite Technical Overview of M–Systems' Flash File Systems", M–Systems Technology Brief, Oct. 1996 (pp. 1–10).

Products Guide, M–Systems (reprinted Apr. 1997), (3 pgs.).

News & Events: Products, Partners and Corporate Press Release Index, M–Systems, (reprinted Apr. 11, 1997), (1 page).

"Intel and M–Systems Sign FTL Marketing Agreement", News and Events Press Releases, M–Systems, Dec. 11, 1995 (2 pgs.).

"AMD Flash Card Products Supported by TrueFFS Software", News and Events Press Releases, M–Systems, Mar. 24, 1997 (2 pgs.).

"M–Systems Announces a NOR Flash Disk Solution Suite", News and Events Press Releases, M–Systems, Aug. 19, 1996 (3 pgs.).

(List continued on next page.)

*Primary Examiner*—John W. Cabeca
*Assistant Examiner*—J. Peikari
*Attorney, Agent, or Firm*—Blakely, Sokoloff, Taylor & Zafman LLP

[57] ABSTRACT

Methods of allocating, writing, reading, de-allocating, re-allocating, and reclaiming space within a nonvolatile memory having a bifurcated storage architecture are described. A method of storing an object within a managed object space of the nonvolatile memory includes the step of determining an object class for the object. Objects of a first class are stored contiguously proceeding from a first end towards a second end of the managed object space to form a first class of space. Objects of a second class are stored contiguously proceeding from the second end towards the first end of managed object space to form a second class of space. A header identifying the object is stored at a bottom of the first class of space. The object is stored at a selected one of the bottom of the first class of space and a bottom of the second class of space in accordance with the object class.

12 Claims, 22 Drawing Sheets

OTHER PUBLICATIONS

"Offering up to 72 Mbytes in a single–chip 32–pin DIP, Flash DiskOnChip 2000 showcases striking improvements in capacity, performance and price", News and Events Press Releases, M–Systems, Embedded Systems Conference, Mar. 17, 1997 (3 pgs.).

"Flash PC Card Performance and Capacity Boosted with the Series 2000 NAND–based Architecture", News and Events Press Releases, M–Systems, Jan. 27, 1997 (2 pgs.).

"FTL, Flash Translation Layer", M–Systems, (reprinted Apr. 11, 1997), (2 pgs.).

"M–Systems Introduces Industry's Fastest SCSI Flash Disk", News and Events Press Releases, M–Systems, Mar. 14, 1996 (2 pgs.).

"FlashDisk alternatives, ATA Versus FTL", M–Systems, May 1996 (8 pgs.).

METHOD OF MANAGING A SYMMETRICALLY BLOCKED NONVOLATILE MEMORY HAVING A BIFURCATED STORAGE ARCHITECTURE

FIELD OF THE INVENTION

This invention relates to the field of computer systems. In particular, this invention is drawn to management of nonvolatile memory.

BACKGROUND OF THE INVENTION

Initialization of a computer system is performed upon power-up of the computer system or hardware or software reset operations. The initialization process is referred to as "booting" the computer system.

In one boot scheme the processor is designed to read a pre-determined memory location when the processor is reset or powered up. The pre-determined memory location stores a boot vector which directs the processor to a memory address of the beginning of the bootstrap routines.

The boot vector typically defaults to an address in read-only memory (ROM). The ROM stores the computer system boot code such as the bootstrap loader and other initialization or micro-operating system routines. The device storing the bootstrap loader and other minimal initialization procedures is referred to as the boot device.

Traditionally, ROM or electrically programmable read only memories (EPROMs) have served as nonvolatile memory for storage of computer system boot code. The boot code may include software such as Basic Input Output System ("BIOS") routines which are specific to the computer system being booted. Thus system specific information is also stored in the ROM or EPROM.

One disadvantage of this approach, however, is the inability to reprogram the ROM or EPROM to accommodate changes in the computer system. The only way to make changes to the BIOS, for example, is to replace the ROM or EPROM. This may be difficult if the ROM or EPROM is soldered to a circuit board. In addition, the computer may have to be at least partially disassembled in order to gain access to the ROM or EPROM.

A programmable nonvolatile memory such as flash electrically erasable programmable read only memory (flash EEPROM) provides a medium that allows the BIOS to be adapted to changing hardware and software conditions. BIOS updates can be performed using an update program in order to modify the BIOS to accommodate, for example, new peripheral devices, additional memory, add-in cards or even to fix errors in the current version of the BIOS.

Flash memory can be reprogrammed only after being erased. Erasure of flash memory must be performed at a block level, thus in order to change a few bytes within a block, the entire block must first be erased. The bootstrap loader, BIOS, and system parameters might be located in separate blocks to facilitate independent modification.

The flash memory used to store boot code and BIOS is typically asymmetrically blocked due to the size differences between the bootstrap loader, BIOS, and system parameter data. Thus the bootstrap loader is stored in a block of one size and the BIOS is stored in one or more blocks of a different size. In addition, blocks storing system specific parameter data might be yet a third size.

One disadvantage of this approach is that asymmetrically blocked architectures are more difficult to expand or extend as the stored code or data changes in size. The block sizes are fixed when the nonvolatile memory is fabricated, thus the block sizes cannot subsequently be changed in order to allocate excess memory from one block to another block.

The asymmetrically blocked architecture typically results in wasted memory because there is no provision for management of the excess memory within individual blocks. BIOS update programs typically replace the contents of the block containing the old BIOS with the new BIOS. Thus any data sharing the same block as the BIOS will be lost when the BIOS is updated. This prevents other applications from being able to use excess memory within a block. Thus another disadvantage of the asymmetrically blocked architecture is the inability to use excess memory within a block.

When updating BIOS, the blocks that the BIOS is stored in must first be erased. If a power failure occurs after starting the erasure of the blocks and before the new version of the BIOS has been completely written, then the new BIOS is left in an unusable state. Furthermore, the computer system cannot recover by using the old BIOS because the old BIOS was deleted when the block was erased. Thus the upgrade process is inherently unreliable because of the inability to return to a former valid state if an error occurs while updating to the new state. Thus another disadvantage of the singly and asymmetrically blocked architectures is the sensitivity of the update process to events such as a power failure.

SUMMARY AND OBJECTS OF THE INVENTION

In view of limitations of known systems and methods, methods of managing nonvolatile memory are provided. A method of storing an object within a managed object space of the nonvolatile memory includes the step of determining an object class for the object. Objects of a first class are stored contiguously proceeding from a first end towards a second end of the managed object space to form a first class of space. Objects of a second class are stored contiguously proceeding from the second end towards the first end of managed object space to form a second class of space. A header identifying the object is stored at a bottom of the first class of space. The object is stored at a selected one of the bottom of the first class of space and a bottom of the second class of space in accordance with the object class.

A method of re-allocating object space for an object stored in a block erasable nonvolatile memory includes the step of locating a beginning and an end of the object, wherein the beginning and end identify every block storing at least a portion of the object including a first block and a last block. For each selected block storing any portion of the object, four steps are performed: 1) a bottom portion of the selected block is copied to a reclaim block if the selected block is the first block, wherein the bottom portion is bound by a bottom block boundary of the first block and the beginning of the object; 2) a top portion of the last block is copied to the reclaim block if the selected block is the last block, wherein the top portion is bound by an upper block boundary of the last block and the end of the object; 3) next, the selected block is erased; and 4) the reclaim block is copied to the selected block, if the selected block is one of the first and the last blocks.

Methods of allocating, reading, writing, and de-allocating objects as well as reclamation of space used by invalid objects are also described.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

I. Computer System Architecture

Figure 1:
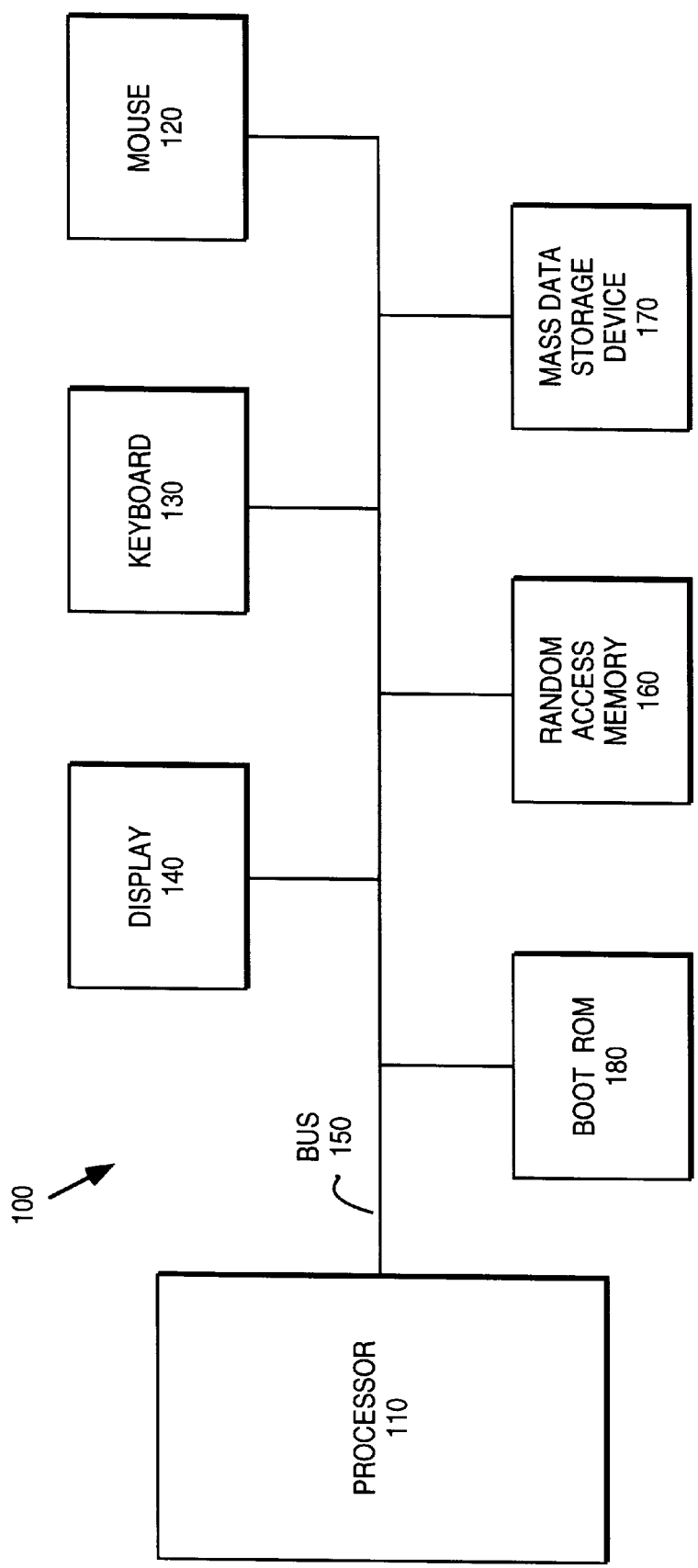
FIG. 1 illustrates a computer system block diagram.

FIG. 1 illustrates a basic microprocessor-based computer system architecture. The computer system 100 includes processor 110. Input devices such as mouse 120 and keyboard 130 permit the user to input data to computer system 100. Information generated by the processor is provided to an output device such as display 140. Computer system 100 generally includes random access memory (RAM) 160 which is used by the processor. Nonvolatile mass data storage device 170 is used to retain programs and data even when the computer system is powered down. In one embodiment nonvolatile mass storage device 170 is an electromechanical hard drive. In another embodiment nonvolatile mass storage device 170 is a solid state disk drive. Mouse 120, keyboard 130, RAM 160, boot ROM 180, and nonvolatile mass storage device 170 are typically communicatively coupled to processor 110 through one or more address and data busses such as bus 150.

Initialization of the computer system is performed upon power-up of the computer system or hardware or software reset operations. In one boot scheme the processor is designed to read a pre-determined memory location when the processor is reset or powered up. The pre-determined memory location stores a pointer or an address which directs the processor to a memory address of the beginning of the bootstrap routines. The pointer or address is referred to as a boot vector.

The boot vector generally defaults to an address in read-only memory (ROM). For software resets, however, the boot vector may point to a RAM location. The ROM stores the bootstrap loader and typically stores other initialization routines such as power on system test (POST). The device storing the bootstrap loader and other minimal initialization procedures is referred to as the boot device. Boot ROM 180 is the boot device in computer system 100.

The ROM may include routines for communicating with input/output devices in the computer system. In some computer systems these routines are collectively referred to as the Basic Input Output System (BIOS). The BIOS provides a common interface so that software executing on the processor can communicate with input/output devices such as the keyboard, mouse, nonvolatile mass memory storage device, and other peripheral devices.

Often parameter information which identifies specific features of the input/output devices is also stored in a nonvolatile memory. In one embodiment, the parameter information is stored in battery-backed complementary metal oxide semiconductor (CMOS) based memory. For example, parameter information might describe the number of disk drives, disk drive type, number of heads, tracks, amount of system RAM, etc.

ROM based storage techniques for BIOS tend to be inflexible with respect to modification. The BIOS provided with the system may have errors or be limited to handling certain kinds or types of peripheral devices. In order to modify the computer system, the ROM containing the BIOS must be replaced. This may require partially disassembling the computer system to gain access to the ROM. The ROM may be difficult to replace if it is solder mounted.

ROMs, programmable read only memory (PROM), and electrically programmable read only memories (EPROMs) represent various types of nonvolatile semiconductor memories. Another type of nonvolatile semiconductor memory is flash electrically erasable programmable read only memory. Unlike the battery-backed CMOS memory used for parameter information storage, flash memories retain their contents without the need for continuous power.

The use of flash memory for storing the BIOS permits greater flexibility in handling system modification or BIOS updates. The BIOS can be updated by running a program thus eliminating the need to replace ROMs.

Flash memory cells cannot be rewritten with new data without first erasing them, with the exception that any flash memory cell storing a "1" can always be programmed to a "0". Generally, flash memory cells are not individually erasable. Flash memories are typically subdivided into one or more individually erasable blocks. An entire block must be erased in order to erase any cell within the block.

Figure 2:
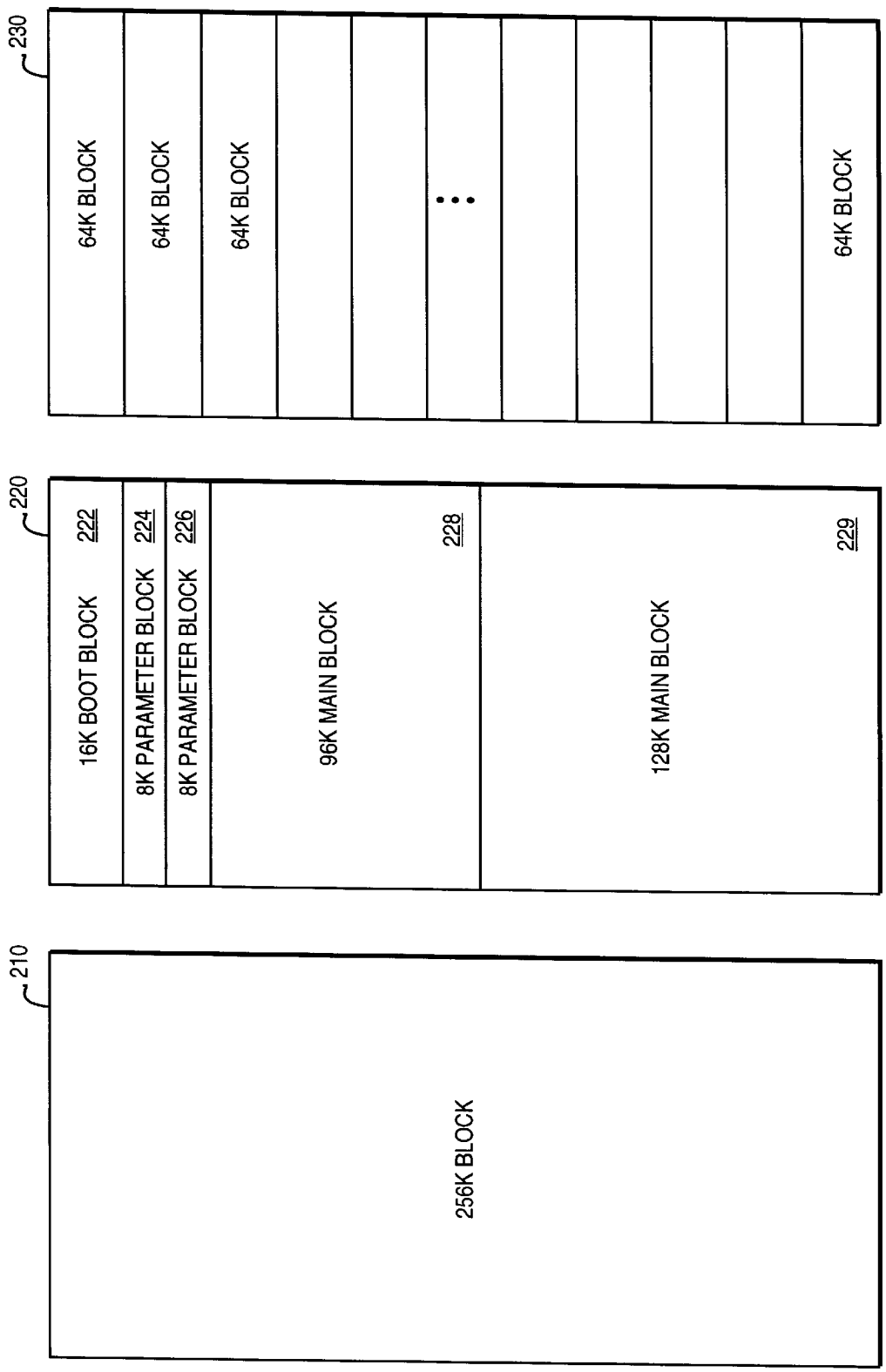
FIG. 2 illustrates singly, asymmetrically, and symmetrically blocked nonvolatile memories.

FIG. 2 illustrates a single block architecture (210) and an asymmetrically blocked architecture (220) for storing the bootstrap routines, parameter data, and BIOS. The single block architecture (210) must be fully erased before being reprogrammed. Thus the bootstrap loader, the BIOS, and computer system specific parameter information are erased every time the BIOS or parameter information is modified.

The bootstrap loader, BIOS, and parameter data can be placed in separate blocks in order to permit independent modification. An asymmetrical blocking architecture is designed to accommodate storage of the bootstrap loader, BIOS, and parameter data in separate blocks in accordance with the relative sizes of the bootstrap loader, BIOS, and parameter data.

Asymmetrical blocked architecture 220 provides separate blocks for bootstrap routines, parameter data, and BIOS. The bootstrap routines are stored in boot block 222. Boot block 222 may also be referred to as startup block 222. Parameter data is stored in blocks 224 and 226. BIOS is stored in blocks 228 and 229. Thus the bootstrap routines, parameter data, and BIOS are treated as objects which can be independently modified by placing them in physically distinct blocks. The boot block may be a hardware-locked block to prevent its modification.

The update process for single and asymmetrically blocked architectures is typically not a reliable process. If a power failure occurs between initiation of the erase procedures and before a block has been completely reprogrammed, the computer system may not be able to properly reboot because the contents of the block may be missing or invalid.

With respect to the single block architecture, a power loss may be particularly catastrophic. Because the flash memory must first be erased before being reprogrammed, the bootstrap loader and other initialization routines may not be available upon power up.

The asymmetrically blocked architecture permits independently updating the BIOS or parameter data without erasing the startup block. The device is blocked so that objects such as bootstrap routines, parameter data, and BIOS can be placed in separately erasable blocks. The need to place all the objects within a nonvolatile memory of predetermined size requires limiting wasted memory within the boot device. These constraints result in a nonvolatile memory having different-sized blocks. The size and number of blocks may need to change as computer systems become more sophisticated. The block sizes of the asymmetrically blocked flash, however, are determined when the nonvolatile memory is fabricated. Thus the asymmetrically blocked architecture tends to be inflexible with respect to expansion of the startup block, parameter information, and BIOS.

For example, the parameter block is fixed in size and thus parameter data cannot exceed the block size determined at the time of fabrication. In addition, because the architecture is designed to store specific types of information in each block, any excess memory within a block is wasted. Excess space within the BIOS block cannot be used because the data stored there will be lost during a BIOS update. Thus the storage "granularity" of an asymmetrically blocked flash architecture varies and is limited to the size of the individual blocks.

An alternative to the singly and asymmetrically blocked architectures is to use a flash memory manager (FMM) in conjunction with a symmetrically blocked architecture 230. The FMM "virtualizes" block boundaries so that each stored object is treated as if it resides in its own block. For applications external to the FMM, this permits handling the stored objects without regard to the physical blocks they reside in or span. Instead of placing functionally distinct routines and data in separate physical blocks to ensure independent modification, the FMM provides a means of managing objects independently of physical block boundaries.

II. FMM Architecture

In order to virtualize blocks, the FMM treats items to be stored as objects. The primary functions performed by the FMM include object allocation, writing, reading, de-allocation, re-allocation, and reclamation.

Figure 3:
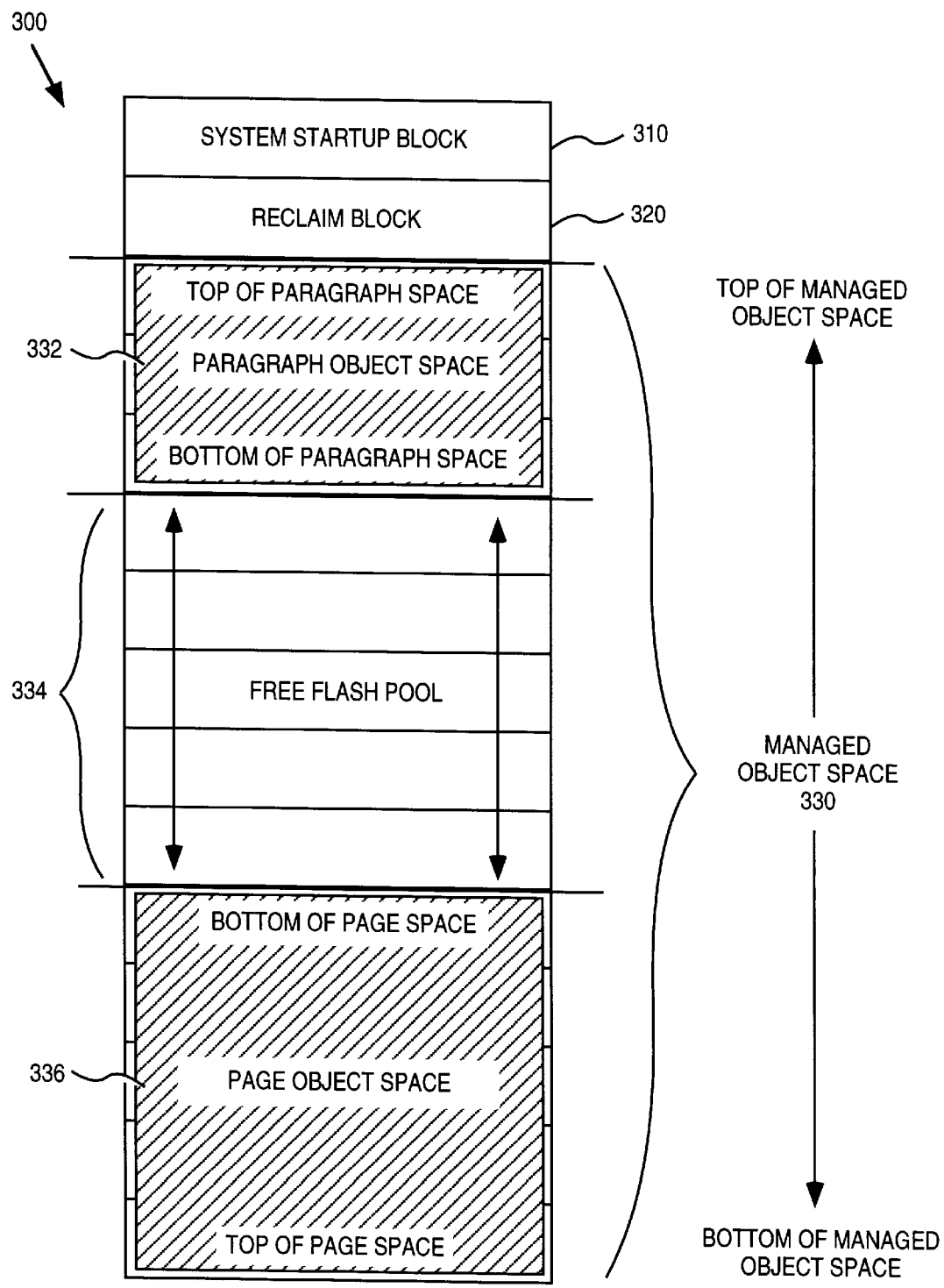
FIG. 3 illustrates division of a nonvolatile memory into the system startup block, reclaim block, and managed object space.

FIG. 3 illustrates one embodiment of the FMM architecture based on symmetrically blocked flash memory 300. The FMM architecture divides the nonvolatile memory into three dedicated areas. These areas include the system startup block 310 and reclaim block 320. The remaining area is referred to as the managed object space 330.

In one embodiment, system startup block 310 contains the necessary minimal amount of code or data required to initialize the computer system. Thus system startup block 310 might store the system initialization code such as a bootstrap loader. In one embodiment, the FMM code is also stored in system startup block 310. Any other code or data required for booting an operating system or defining system parameters may be stored as an object within the managed object space 330. For example, BIOS may be treated as an object and stored within managed object space 330.

The size of system startup block 310 is determined by the flash block size and data bus organization. In one embodiment, the system startup block is a single, one time programmable block that is not accessible by the FMM for object storage. In an alternative embodiment, the system startup routines are stored in a plurality of contiguous system startup blocks.

Reclaim block 320 is used during the process of reclaiming memory allocated to objects that are no longer valid. In the embodiment illustrated, reclaim block 320 is located immediately after the startup block. In an alternative embodiment, reclaim block 320 is located in another dedicated location within the flash memory. Although only one block is illustrated for reclaim, other embodiments might use a plurality of reclaim blocks or other form of temporary storage.

FMM stores objects within managed object space 330. FMM provides for two classes of objects: paragraph objects and page objects. The managed object space is divided into regions to accommodate the distinct object classes. In particular, page space 336 stores page objects and paragraph space 332 stores paragraph objects. Thus managed object space 330 is a bifurcated managed object space. Object allocation, writing, reading, de-allocation, re-allocation, and reclamation functions vary depending upon whether the functions are performed for paragraph objects or page objects.

Referring to FIG. 3, space for paragraph objects is contiguously allocated from the top of managed object space 330 and grow towards the bottom of managed object space 330. Paragraph objects are always aligned on a paragraph boundary. A paragraph object is allocated an integer number of paragraphs when stored. In one embodiment, a paragraph is 16 bytes, thus any paragraph object will use an integer number of 16 byte paragraphs.

Page objects are contiguously allocated from the bottom of the managed object space 330 and grow towards the top of managed object space 330. Page objects are always aligned on a page boundary. A page object is allocated an integer number of pages when stored. In one embodiment, pages are 4K in size, thus any page object will use an integer number of 4K pages.

In order to perform object allocation, writing, reading, de-allocation, re-allocation, and reclamation within the managed object space, FMM uses a number of data structures. These data structures serve as tracking or auditing structures for managing the storage of the objects. In one embodiment, these data structures are stored within the managed object space. In an alternative embodiment, the data structures are not stored within the same managed object space as the objects they track.

One of the data structures used by FMM is a header. Every object within managed object space is identified by a header. In one embodiment, the headers are stored in paragraph space 332, thus the headers themselves are also paragraph objects.

Headers may be further classified as paragraph headers and page headers. Paragraph headers identify another paragraph object. This object is referred to as paragraph data. Thus paragraph headers and their associated paragraph data are stored within paragraph space.

Page headers identify a page object. The page object may alternatively be referred to as page data. Page data is stored in page space. The page headers, however, are stored in paragraph space.

Figure 4:
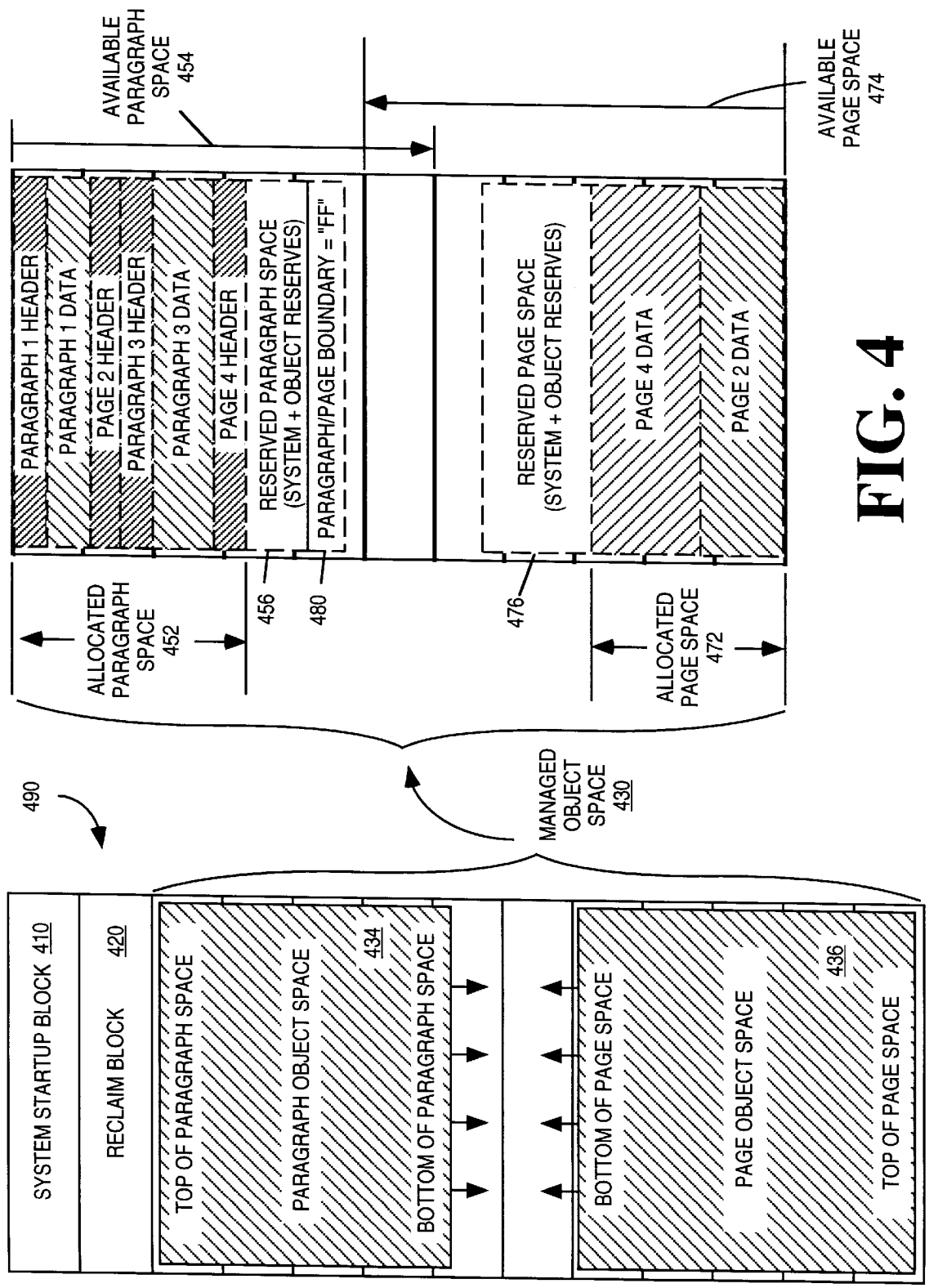
FIG. 4 illustrates the arrangement of managed object space.

FIG. 4 illustrates page and paragraph objects stored in managed object space 430 within nonvolatile memory 490. The top of managed object space 430 starts immediately after reclaim block 420. The top of allocated paragraph space 434 coincides with the top of managed object space 430. The top of allocated page space 436, however, coincides with the bottom of managed object space 430. The bottoms or ends of allocated page space and allocated paragraph space grow towards each other as page or paragraph space is allocated.

Headers for identifying paragraph objects and page objects are stored within paragraph object space along with other paragraph objects. The location of objects within their respective spaces is determined by proximity. Objects are contiguously located in their respective object spaces such that no gaps exist between objects.

Paragraph data is located immediately after the paragraph header that identifies that paragraph object. Given that the length of the header and the length of the identified paragraph data are known, the location of the next header or other paragraph object is also known.

The position of a page header relative to other page headers determines the location of page data in page space. For example, the location of page 4 within page space is determined by summing the page space used by all preceding page objects. This is accomplished by summing the size indicated by page headers preceding the page 4 header. In this example, the only preceding page header is the page 2 header. Given that page objects are allocated contiguously from the bottom of managed object space towards the top of managed object space, the size of the preceding page objects (page 2) indicates an offset from the top of page object space to the beginning of the desired page object (page 4).

Figure 5:
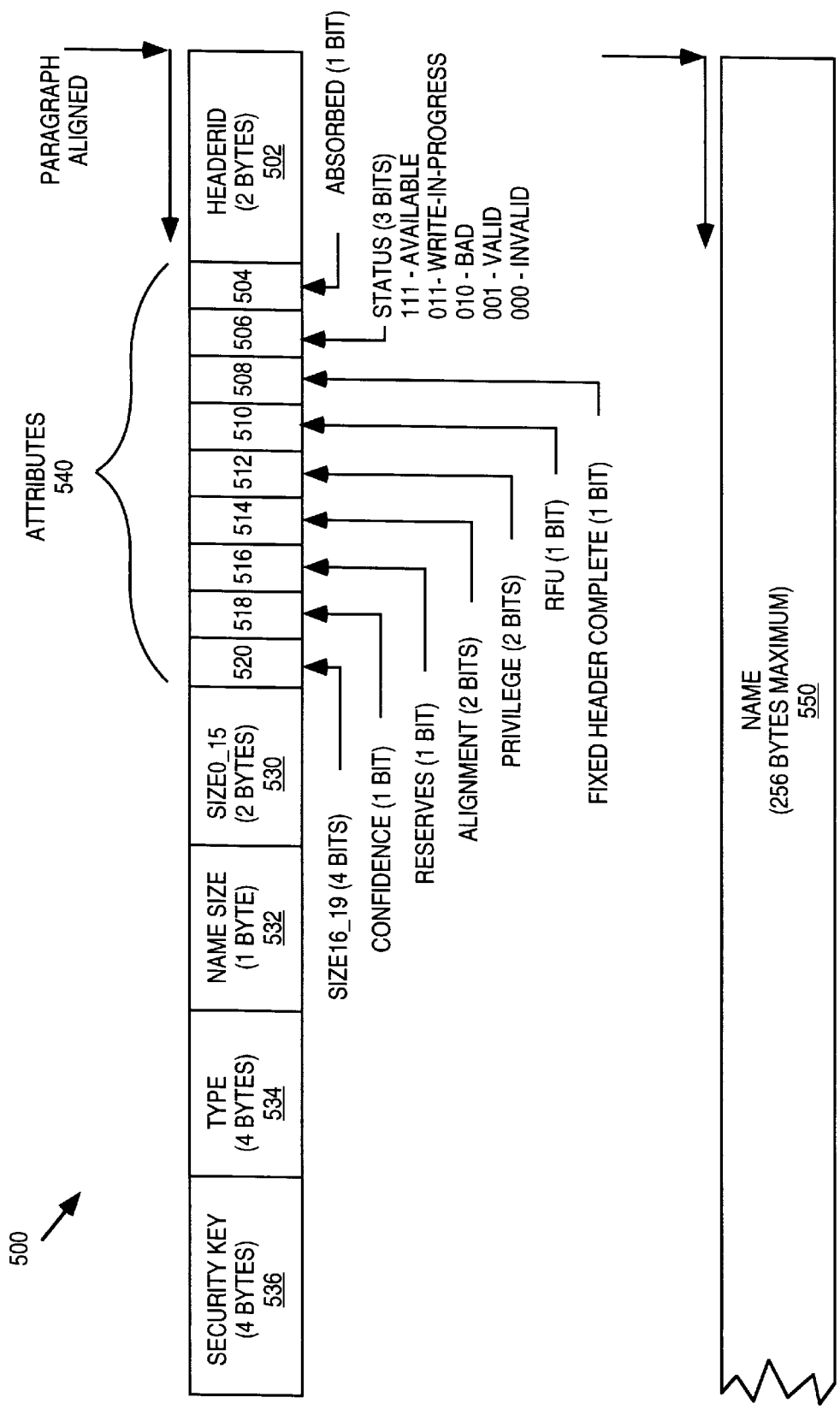
FIG. 5 illustrates a data layout for a header.

FIG. 5 illustrates one embodiment of a header data structure 500. A definition of the header fields is included in Appendix I.

III. FMM Processes

Primary processes of the FMM include object allocation, writing, reading, de-allocation, re-allocation, and reclamation.

A. Allocation

Figure 6:
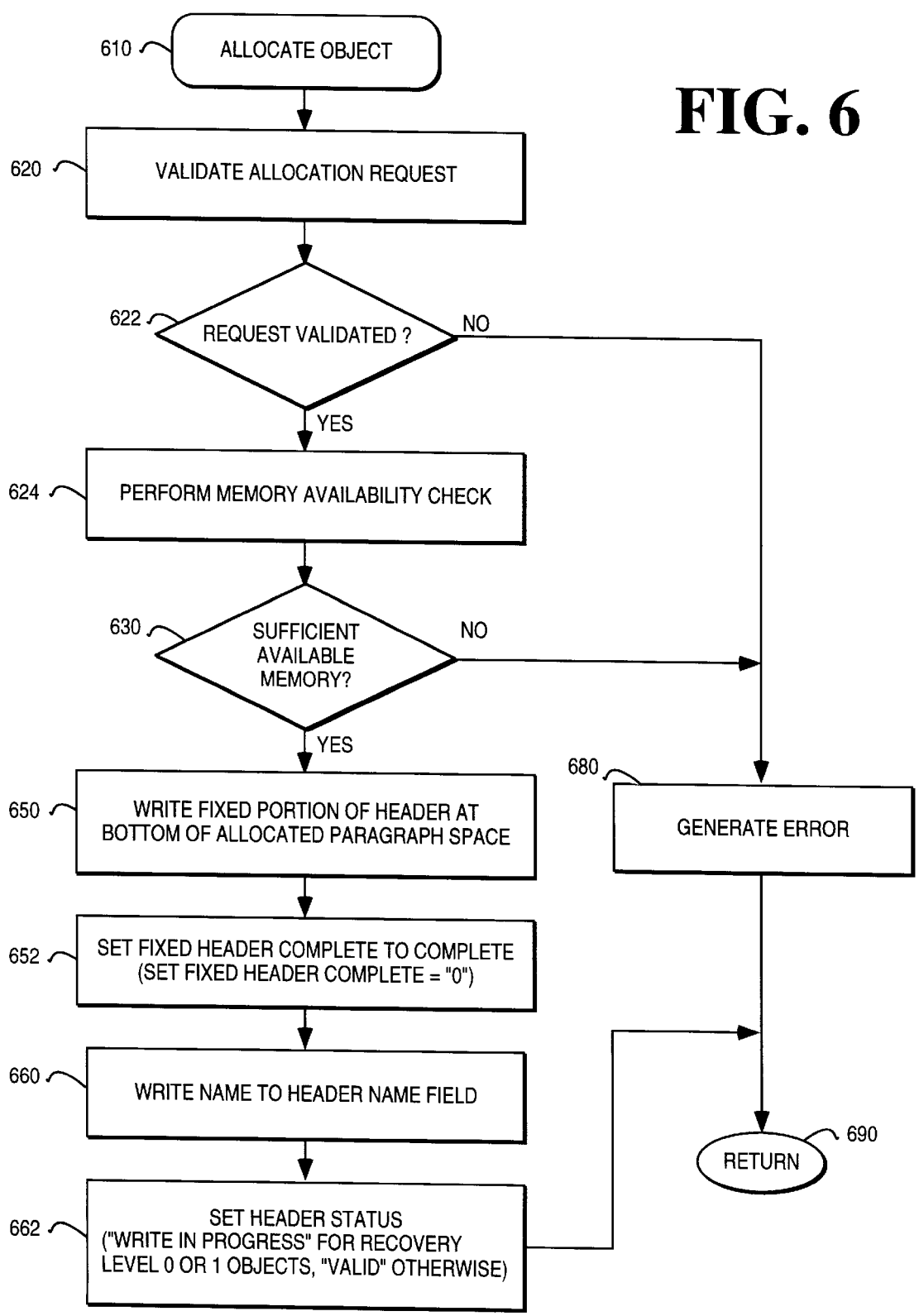
FIG. 6 illustrates a method for allocating space for an object.
Figure 7:
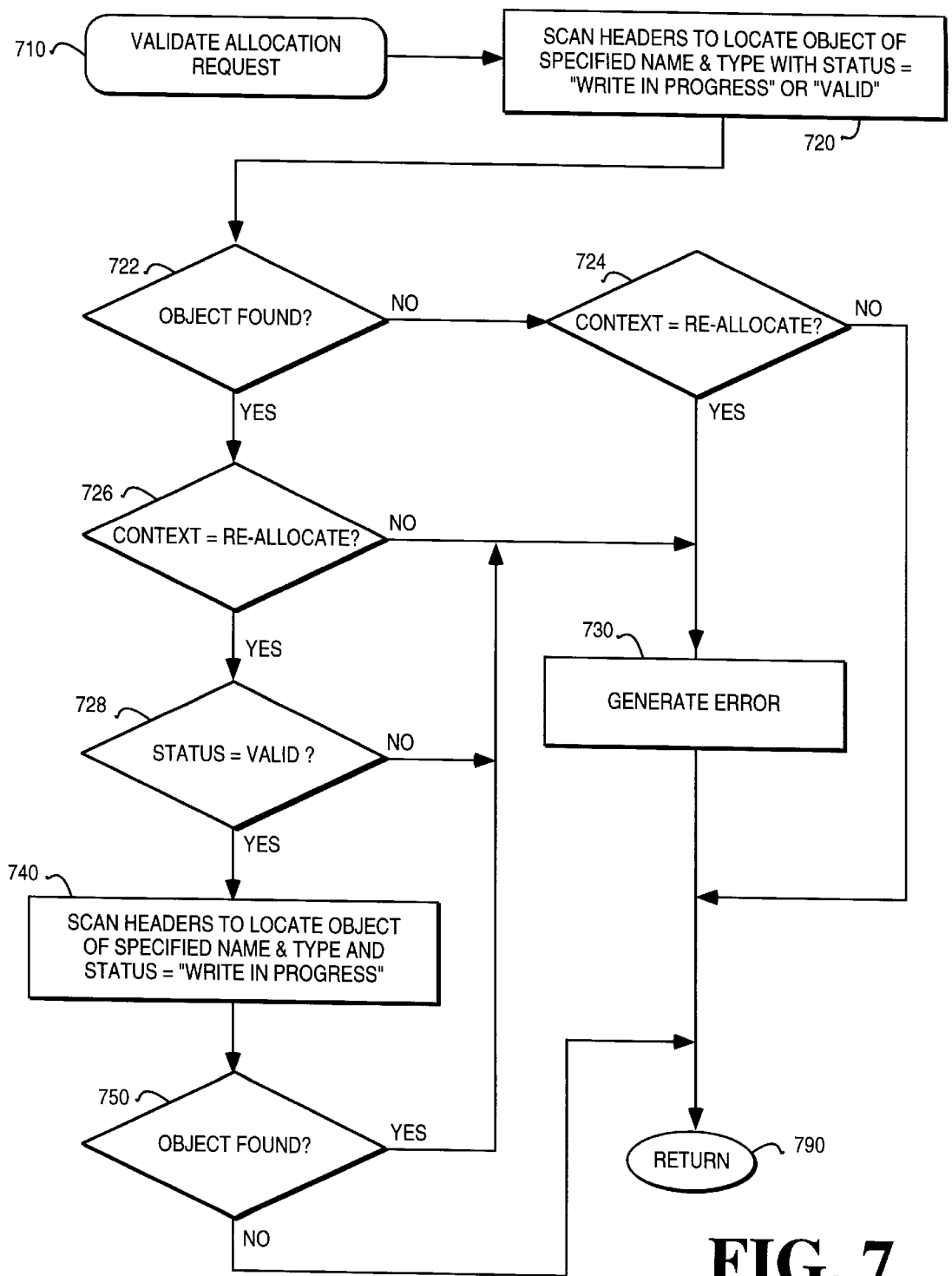
FIG. 7 illustrates a method for validating an allocation request.
Figure 8:
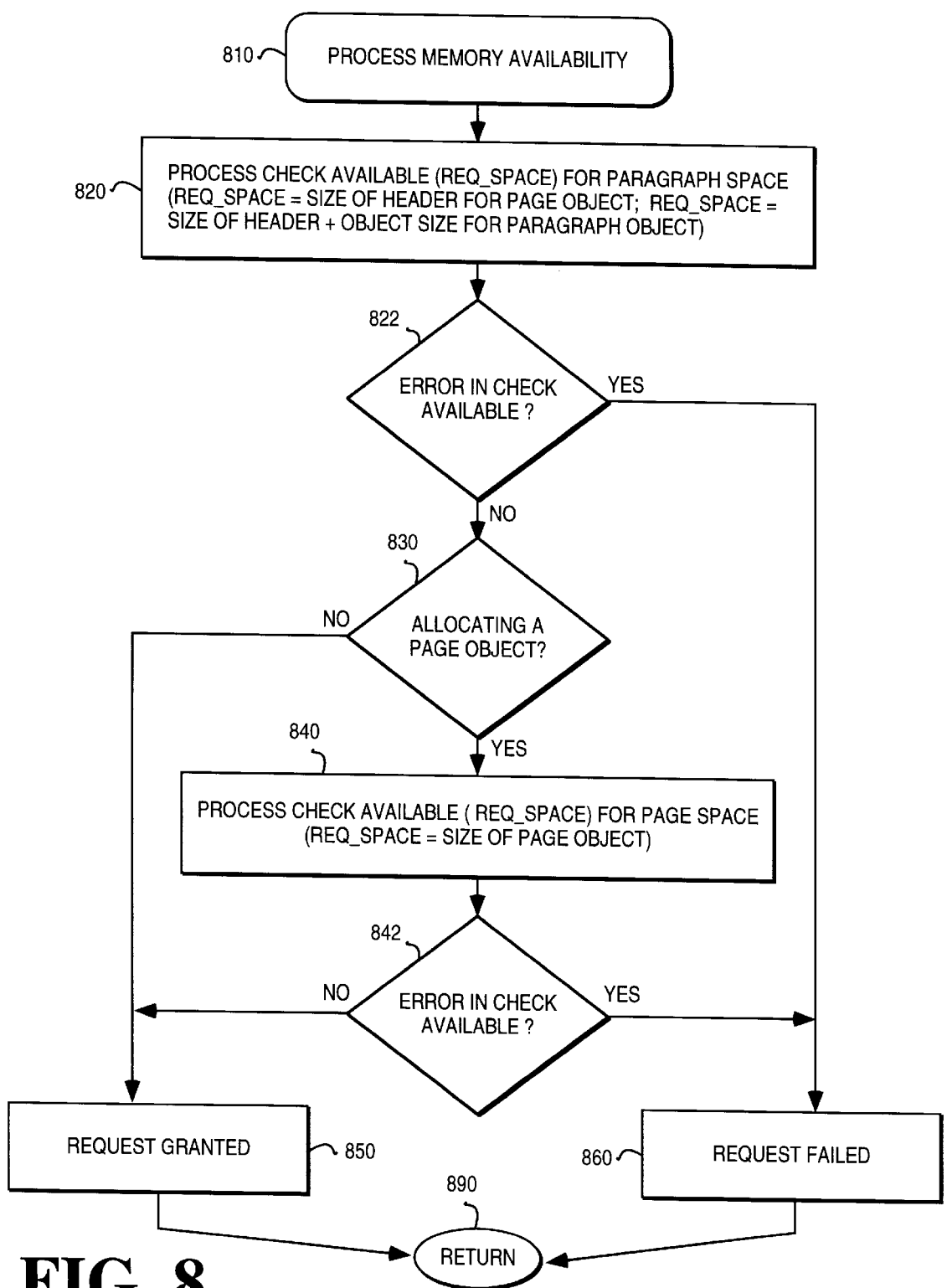
FIG. 8 illustrates a method for determining memory availability during object allocation.

FIGS. 6–8 illustrate the allocation process. The allocation process is used when 1) initially allocating space for an object, and 2) when re-allocating space for an object. The process varies depending upon whether the context is initial allocation or re-allocation.

Referring to FIG. 6, the allocate object process begins in step 610. In order to allocate space for an object, certain properties of the object must be provided. Referring to FIG. 5, in one embodiment, the Name 550, Name Size 532, Type 534, Size (i.e., Size0_15 (530) and Size16_19 (520)), and Alignment 514 properties must be provided. Once space has been allocated, the space may be written to or read from. In addition the object can be de-allocated or re-allocated. In one embodiment, Name 550 and Type 534 are used in conjunction with Status 506 to uniquely identify objects after allocation.

In step 620, the allocation request is validated. FIG. 7 illustrates validation of the allocation request in greater detail beginning with step 710. If the context of the current request is re-allocation, then a valid object having the specified Name and Type should already exist. If, however, the context of the current request is initial allocation, the request cannot be granted if a valid object having the specified Name and Type already exists.

Step 720 scans paragraph space to locate the first object of the specified Name and Type which has a status of "Valid" or "Write In Progress." Step 722 determines whether such an object was found. If such an object is not found, then step 724 determines whether the context is re-allocation. If the context is re-allocation, an error is generated in step 730 to indicate that a re-allocation attempt was made on a non-existent object. Lack of another valid object having the same Name and Type is required for initial allocation, thus if the context is not re-allocation the allocation may proceed in step 790.

If step 722 determines that the object sought in step 720 is found, processing continues with step 726. Step 726 determines if the current request context is re-allocation. If the current context is not re-allocate, an error is generated in step 730 due either to a non-unique Name and Type key (when Status="Valid") or a prior incomplete re-allocation operation (when Status="Write In Progress"). If the current context is re-allocate, then steps 728 thru 750 are performed to ensure that an unfinished re-allocation is not currently being performed.

During a re-allocation operation the allocate object process may be used to create a duplicate of the object being re-allocated. Thus a duplicate object having the same Name and Type may exist if a re-allocate object process has already been initiated for that object. However, proceeding from the top of the managed object space, the header for the original object will be encountered before the header for the duplicate object is encountered. The first object having the specified Name and Type will have a status of "Valid." A duplicate of the first object will have a status of "Write In Progress."

Thus step 728 determines if the first found object of either "Write In Progress" or "Valid" has a status of "Valid." If the status is not "Valid," then allocation cannot proceed. An error is generated in step 730.

If the status is "Valid," however, processing continues with steps 740 and 750 to ensure that a re-allocation operation is not already in progress. In step 740 the headers are scanned to locate an object of the specified Name and Type having a status of "Write In Progress."

If a subsequent object meeting the conditions of step 740 is found in step 750, then re-allocation has already been initiated for the original object and space should not be allocated for a concurrent re-allocation. Thus processing proceeds to step 730 to generate an error to indicate that re-allocation is already in process for the object.

If no object meeting the conditions of 740 is found, then a re-allocation may be performed for the identified object. Thus processing continues in step 790.

Returning back to FIG. 6, step 622 determines whether an error occurred during validation of the request. If an error occurred during validation, then processing continues with step 680 to generate an error. The allocation process then returns in step 690 without having allocated the requested space.

If the request is validated in step 622, step 624 performs a memory availability check to determine if memory can be allocated as requested. Steps 630 determines whether there is sufficient space available for allocation. If there is insufficient space, then an error is generated in step 680 and processing is completed in step 690 without performing the allocation. If there is sufficient space, however, processing proceeds to step 650.

Steps 650, 652, 660, and 662 effectively write the header at the bottom of the presently allocated paragraph space. In the embodiment illustrated, the fixed portion of the header and the Name are written in distinct steps.

In step 650, the fixed portion of the header is written. Referring to FIG. 5, the fixed portion of the header refers to the non-Name fields of the header. In step 652, the attribute bit FixedHeaderComplete is programmed to "0" to indicate that the fixed portion of the header has been written. In step 660, the Name is written to the header.

The header status is set in step 662. If the object is a Recovery Level 0 or 1 object (as described with respect to re-allocate), then the header status is set to "Write In Progress," otherwise the header status is set to "Valid." Allocation is then completed in step 690.

FIG. 8 illustrates step 624 of FIG. 6 in greater detail. In particular, FIG. 8 illustrates a method for determining space availability within the bifurcated object space.

Generally, the non-allocated area between the bottom of allocated paragraph space and allocated page space is a free memory area (e.g., free flash pool 334) which may be allocated to either paragraph or page space. In one embodiment, however, the allocation process must adhere to a number of constraints.

One constraint is to ensure that paragraph and page objects do not share the same block. For example, if the first allocation within a block is for a paragraph object, none of the remaining space within that physical block can be allocated for page objects. Similarly, if the first allocation within a block is for a page object, none of the remaining space within that physical block is allocated for paragraph objects. Once space has been allocated for one class of object space within a physical block that physical block is not used for storing a different class of object space. In one embodiment, a block is generally available for either class of object unless space has already been allocated in the block (see, e.g., overlap of available paragraph space 454 and available page space 474 in FIG. 4).

Another constraint is to provide for a buffer between the bottom of paragraph space and the bottom of page space to demarcate the boundary between page and paragraph space. This boundary is used when scanning paragraph space for headers to determine when the end of paragraph space has been reached. In one embodiment at least one paragraph of "1"s (i.e., "FF") is reserved as a buffer between allocated page space and allocated paragraph space in order to mark the boundary between the two classes of object space. Referring to FIG. 4, this boundary is embodied as paragraph/page boundary 480 and is detailed as a component of reserved paragraph space 456.

Another constraint is to ensure that space is reserved so that certain objects can be duplicated. FMM provides for three levels of update reliability during the re-allocation process: Recovery Level 0, 1, and 2. An object's Recovery Level is controlled by a combination of the Confidence (518) and Reserves (516) bits in the object's header.

A Recovery Level of 2 indicates that no duplicate of the object needs to be made during re-allocation. A Recovery Level of 1 indicates that a duplicate of the object is to be made during re-allocation. A Recovery Level of 0 indicates that a duplicate of the object is to be made. A Recovery Level of 0 further requires that sufficient reserves be maintained such that a duplicate of the object can be made.

Recovery Level 1 only ensures that a re-allocate operation will not be performed if there is not sufficient memory to make a duplicate of the object. Recovery Level 0 ensures that a re-allocate operation can always be performed for the object by reserving sufficient space to ensure that a duplicate of the object can be made. This reserved space is illustrated in FIG. 4 as reserved paragraph space 456 and reserved page space 476.

Reserved paragraph space 456 includes object reserves and system reserves. The object reserves are large enough to accommodate the largest paragraph object having a Recovery Level of 0 plus a header for that object. The system reserves include the paragraph page boundary 480, room to accommodate a paragraph reclaim marker, a paragraph reclaim header, and a page reclaim header. Reserved page space 476 includes object reserves and system reserves. The object reserves are large enough to accommodate the largest page object having a Recovery Level of 0. The system reserves are large enough to accommodate a page reclaim marker.

Another constraint is to ensure sufficient memory always exists to perform a reclaim operation. This is accomplished through the use of system reserves within reserved paragraph space 456 and reserved page space 476. As described above, sufficient system reserves are maintained within reserved paragraph space 456 to ensure that a paragraph reclaim operation can be initiated. Similarly sufficient system reserves are maintained within reserved page space 476 to ensure that a page reclaim operation can be initiated.

During the allocation process only Recovery Level 0 objects have the use of reserved object space. The determination of memory availability in step 624 of FIG. 6 is further detailed in FIG. 8 beginning in step 810.

For every object being allocated, step 820 ensures that sufficient availability exists in paragraph space to accommodate the object. All objects require a header in paragraph space. Thus step 820 checks the availability of the required space (REQ_SPACE) within paragraph space. In step 820, REQ_SPACE is just the size of a header for page objects. REQ_SPACE is the size of a header plus the size of the object for paragraph objects.

Step 822 determines if an error occurred when checking the availability of paragraph space. If an error occurred, then the request failed as indicated in step 860. Processing is finished in step 890.

If an error did not occur, then step 830 determines if the space is being requested for a page object. If not, then the request can be granted as indicated in step 850. Processing is then completed in step 890.

If the space is being requested for a page object, then step 840 determines if sufficient page space exists to accommodate the object. The check available process is called to determine the availability of REQ_SPACE within page space. In this case REQ_SPACE is the size of the page object.

If 842 detects that an error occurred in step 842 then the allocation request has failed as indicated in step 860. Otherwise the allocation request can be granted as indicated in step 850. Once the request is granted or failed, memory availability processing is completed in step 890.

Figure 22:
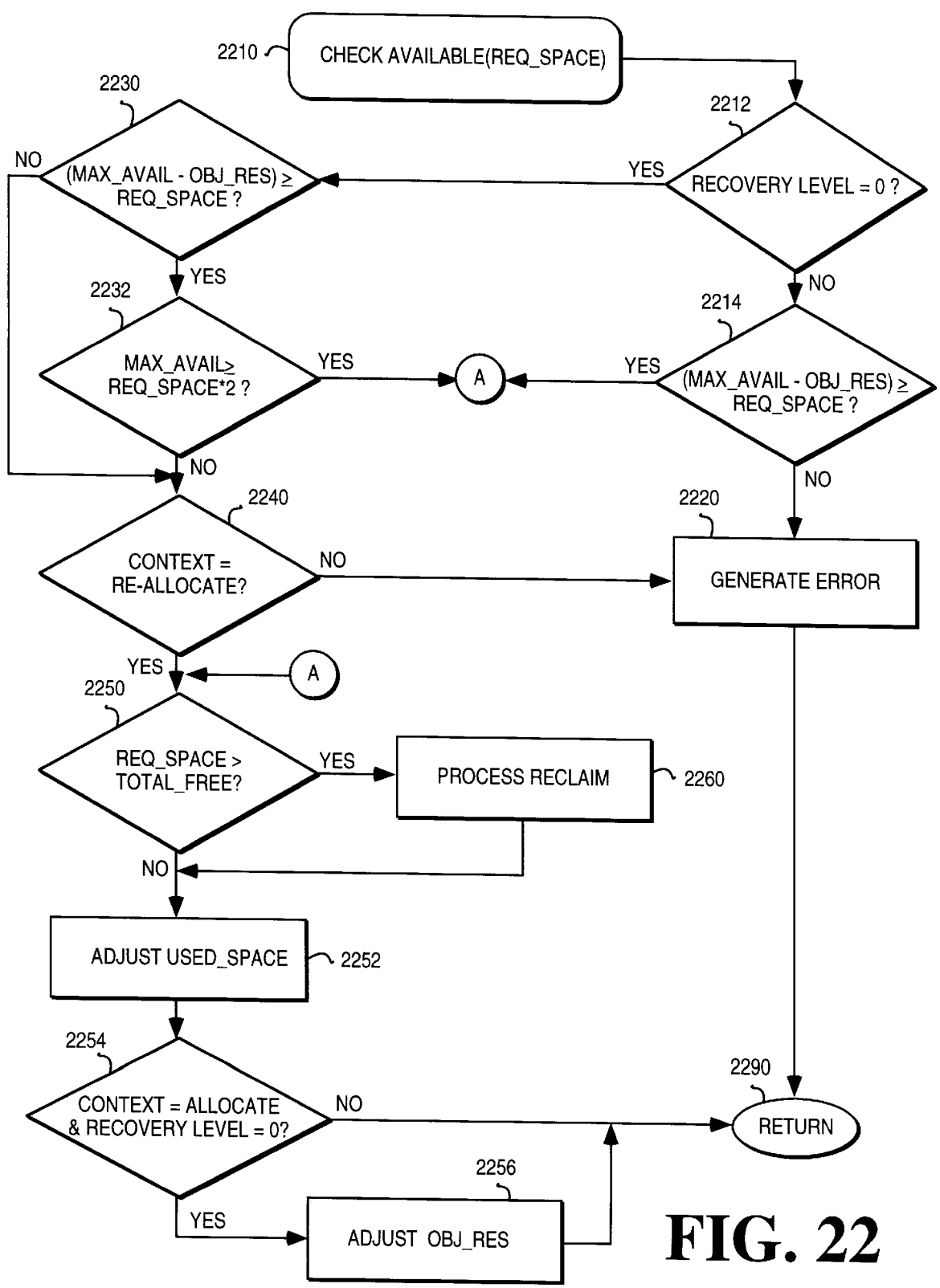
FIG. 22 illustrates a detailed method for checking availability of a requested page or paragraph space during allocation.

FIG. 22 illustrates the check availability process of steps 820 and 840 in FIG. 8 in greater detail beginning with step 2210. A common flowchart is used to describe the check availability process for both paragraph and page objects. The variables used correspond to the specifics of the class of object space being requested and not a total within all of managed object space. For example, during a paragraph object availability check "OBJ_RES" refers to the paragraph object reserves only. Similarly during a page object availability check, OBJ_RES refers to the page object reserves only.

The variables MAX_AVAIL, OBJ_RES, TOTAL_FREE, and USED_SPACE are defined as follows. MAX_AVAIL is the total amount of space for the selected object class that could be allocated to objects (and associated headers if appropriate) after a reclaim operation less any system reserves.

OBJ_RES is the size of the object reserves for the selected class of object. USED_SPACE is the space consumed by system reserves, valid objects and associated headers, if appropriate.

TOTAL_FREE is MAX_AVAIL less the space used by de-allocated objects and headers if appropriate.

Step 2212 determines whether the allocation request is for a Recovery Level 0 object. If the object is not a Recovery Level 0 object, then the allocation request cannot use object reserves. Step 2214 determines if MAX_AVAIL less OBJ_RES is sufficient to accommodate REQ_SPACE. If so, then the allocation request will be granted and processing continues with step 2250. If not, an allocation error is generated in step 2220 and availability checking is completed in step 2290.

If step 2212 determines that the allocation request is for a Recovery Level 0 object, then step 2230 determines if (MAX_AVAIL−OBJ_RES) is greater than or equal to REQ_SPACE. If not then processing continues in step 2240. If so, then step 2232 determines if sufficient space exists (including objects reserves) to accommodate allocating this object and subsequently allocating a duplicate of the object. Step 2232 determines if MAX_AVAIL≧REQ_SPACE*2. If not, processing continues in step 2240, otherwise the request can be granted and processing continues with step 2250.

Step 2240 determines if this allocation is an original allocation request or if the allocation request was initiated during the re-allocation process. If the context of the allocation request is re-allocate, then sufficient space was reserved for the object at original allocation and thus the request can be granted by continuing with step 2250. Otherwise, if the context is not re-allocate, then an allocation error is generated in step 2220 and availability checking is finished in step 2290.

Step 2250 tests to determine if REQ_SPACE is greater than TOTAL_FREE. If so, then a reclaim operation must be performed in order to free up object space used by de-allocated objects. Otherwise the space used by the de-allocated objects is not necessary since the requested space is fully accommodated by the remaining free space. A call to initiate the reclaim process is issued in step 2260.

Step 2252 adjusts a USED_SPACE variable. Adjusting the USED_SPACE variable prevents subsequent allocation requests from using the space being granted. This ensures that the current object will, in fact, be able to subsequently be allocated.

Step 2254 determines if the request is an original allocation request for a Recovery Level 0 object. If so, then object reserves may need to be adjusted as indicated in step 2256. Otherwise check availability processing is completed in step 2290.

In step 2256, the present object may be larger than any other previously allocated Recovery Level 0 object. If so then the object reserves for this class of object space must be increased. After adjusting the object reserves in step 2256 (if necessary) check availability processing is completed in step 2290.

B. Writing

Figure 9:
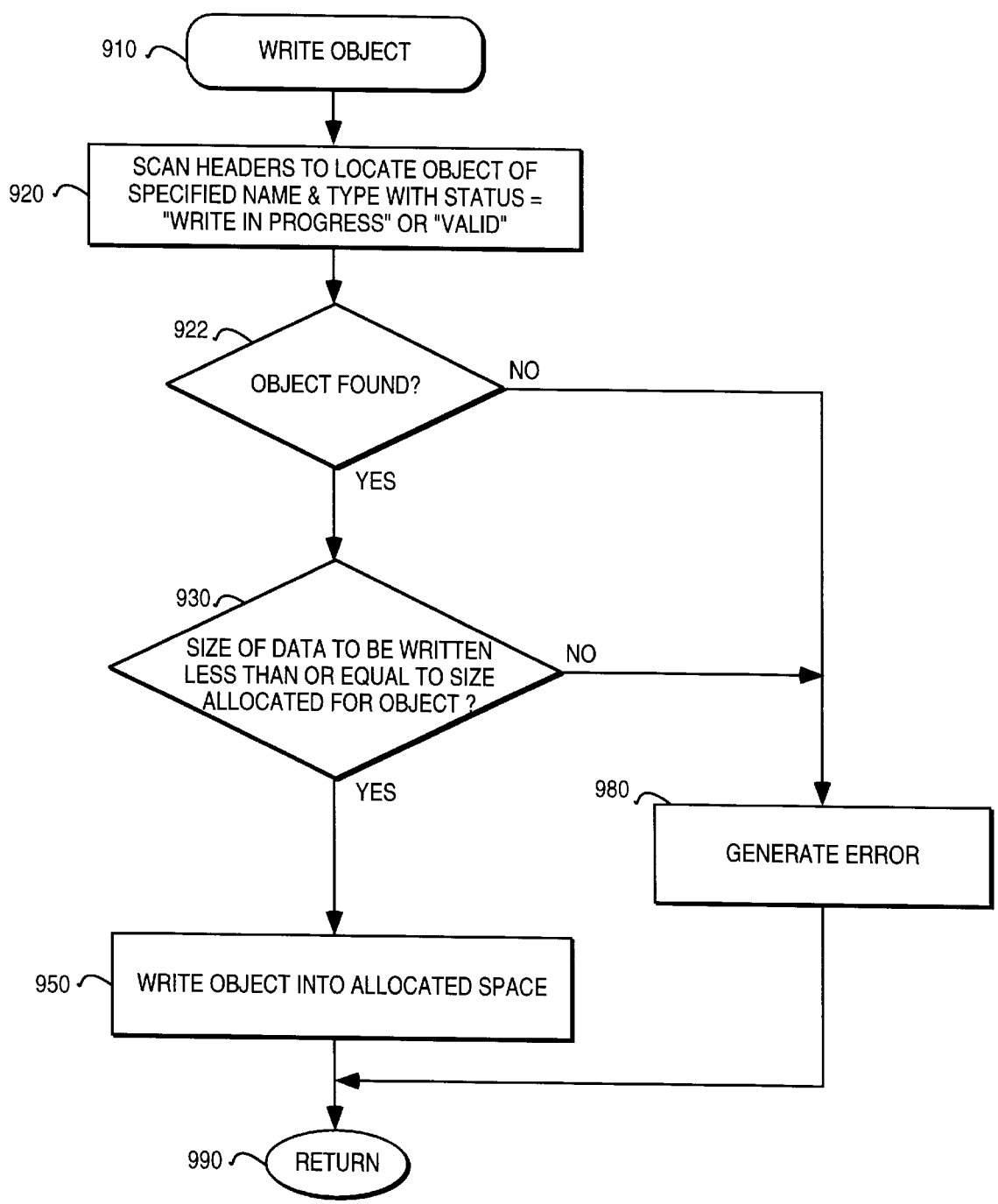
FIG. 9 illustrates a method for writing an object into space allocated for the object.

FIG. 9 illustrates a flowchart for writing an object in managed object space beginning with step 910.

In step 920, the headers are scanned to locate an object of a specified Name and Type having a status of "Write in Progress" or "Valid." Step 922 determines if such an object is found. If no such object is found, then an error is generated in step 980 and processing is completed in step 990. A write operation can only be performed on previously allocated space.

If the object is found in step 922, then error checking is performed in step 930. Step 930 determines whether the size of the data to be written is less than or equal to the size allocated for the object.

When writing an object to allocated space, there is no requirement that the object consume all of the allocated space. If, however, the size of the data to be written exceeds the space allocated for the object then an error is generated in step 980 and the write object process is finished without writing anything in step 990. In an alternative embodiment, FMM truncates the data to be written instead of generating an error.

If the size of the data to be written does not exceed the space allocated for the object, then step 950 writes the object into its associated allocated space. The write process is then completed in step 990.

Referring to FIG. 4, paragraph space is allocated contiguously proceeding from the top of managed object space to the bottom of managed object space. Page space is allocated contiguously proceeding from the bottom of managed object space to the top of managed object space. The "top" and "bottom" of an allocated space varies in accordance with the class of the object.

In one embodiment, an object is always written contiguously proceeding toward the top of managed object space. In one embodiment the bottom of managed object space has a lower memory address than the top of managed object space. This method of writing ensures that objects are always written beginning at a lower address and proceeding to a higher address.

In other words, space is allocated contiguously from the top of paragraph or page space towards the bottom of paragraph or page space, respectively. Data is always written within an allocated space proceeding towards the top of managed object space. Thus paragraph data is written beginning at the bottom of the specified allocated space and proceeding towards the top of managed object space. Similarly page data is written beginning at the top of the specified allocated space and proceeding towards the top of managed object space (e.g., see FIG. 16). If the top of managed object space has a higher address than the bottom of managed object space, this approach ensures that objects are always written beginning at a lower address and proceeding towards a higher address independently of the class of the object.

After the object has been written, the process of writing the object is completed in step 990.

Figure 10:
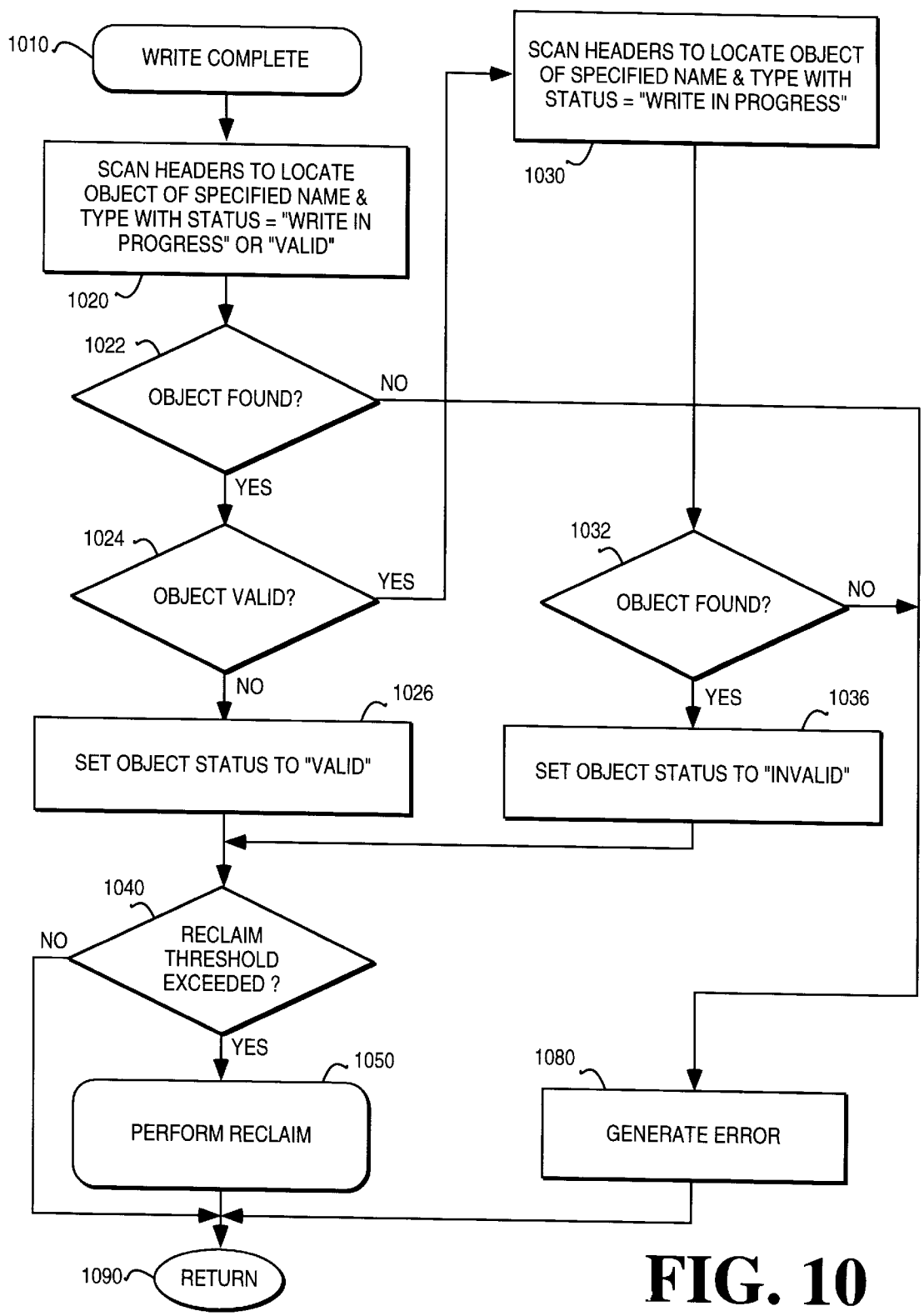
FIG. 10 illustrates a Write Complete process.

A duplicate of an object may be created during the re-allocate process. This duplicate will have a status of "Write In Progress." The header for the original object will have a status of "Valid." FMM uses a Write Complete function to invalidate one of the two objects. The Write Complete function is also used to set the status of Recovery Level 0 and 1 objects to valid. FIG. 10 illustrates the Write Complete process beginning in step 1010.

In step 1020, the headers are scanned to locate an object of specified Name and Type having a status of "Write In Progress" or "Valid." Step 1022 determines if such an object is found. If the object is not found, then an error is generated in step 1080 and the Write Complete function is finished in step 1090.

If the object is found, step 1024 determines whether the status is "Write In Progress" or "Valid." If the status is other than "Valid," then the status is set to "Valid" in step 1026 and processing continues in step 1040.

If the status is determined to be "Valid" in step 1024, then processing continues in step 1030. Step 1030 scans headers to locate an object of the specified Name and Type having a status of "Write In Progress." Step 1032 determines if such an object exists. If the object is not found, then an error is generated in step 1080 and the process is completed in step 1090.

If the object is determined to exist in step 1032 then the status of the object is set to "Invalid." Processing continues in step 1040.

Once the status has been properly set in either step 1026 or 1036, step 1040 determines if a reclaim threshold has been exceeded. In one embodiment, the reclaim threshold is a measure of the total amount of space consumed by invalid objects versus the total amount of memory in managed object space. Once this threshold is crossed a reclamation operation is performed in step 1050. From either step 1040 or step 1050, the Write Complete process is finished in step 1090.

C. Reading

Figure 11:
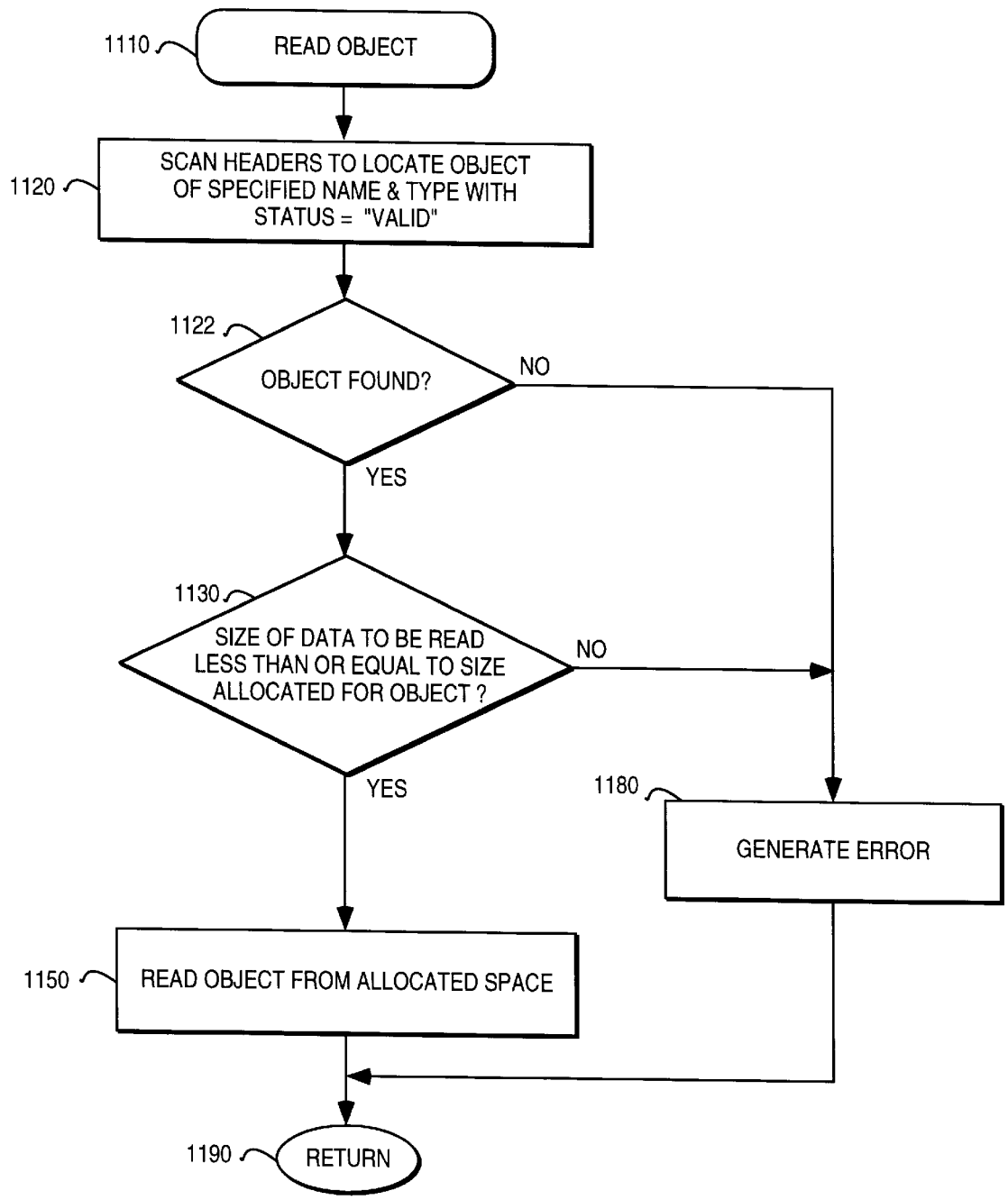
FIG. 11 illustrates a method for reading an object.

The process of reading an object is illustrated in FIG. 11 beginning with step 1110. In order to read an object, the object must be identified by Name and Type.

In step 1120, paragraph space is scanned to locate a header identifying a valid object of the specified Name and Type. Step 1122 determines whether such an object was found. If no such object is found then an error is generated in step 1180 and the read object process is finished in step 1190.

In one embodiment, an amount to be read is provided with the read request. If step 1122 determines the object is found, then the read process ensures that the size of the data requested is less than or equal to the space allocated for the object in step 1130. If the read request is requesting data beyond what is allocated for the object, then an error is generated in step 1180 and the read process is completed in step 1190.

Alternatively, if the size of the data requested is less than or equal to the space allocated for the object, then processing continues from step 1130 to read the object in step 1150. For paragraph objects, the allocated space is of a size indicated by Size and is located immediately after the header. For page objects, the allocated space is of a size indicated by Size. The location of the allocated space, however, is determined by adding the Size field of all "non-absorbed" page headers preceding the header of the object being read. "Non-absorbed" refers to the state of the "Absorbed" bit in the header. The use of the Absorbed field is described in greater detail with respect to the reclamation process.

After reading the object in step 1150, the read object process is completed in step 1190.

D. De-allocation

When a request to delete an object is received, FMM marks the object for deletion instead of immediately reclaiming the space used by the object. De-allocation is accomplished by marking the status of the header as "invalid". De-allocated space cannot be re-used until reclamation of the object occurs.

Figure 12:
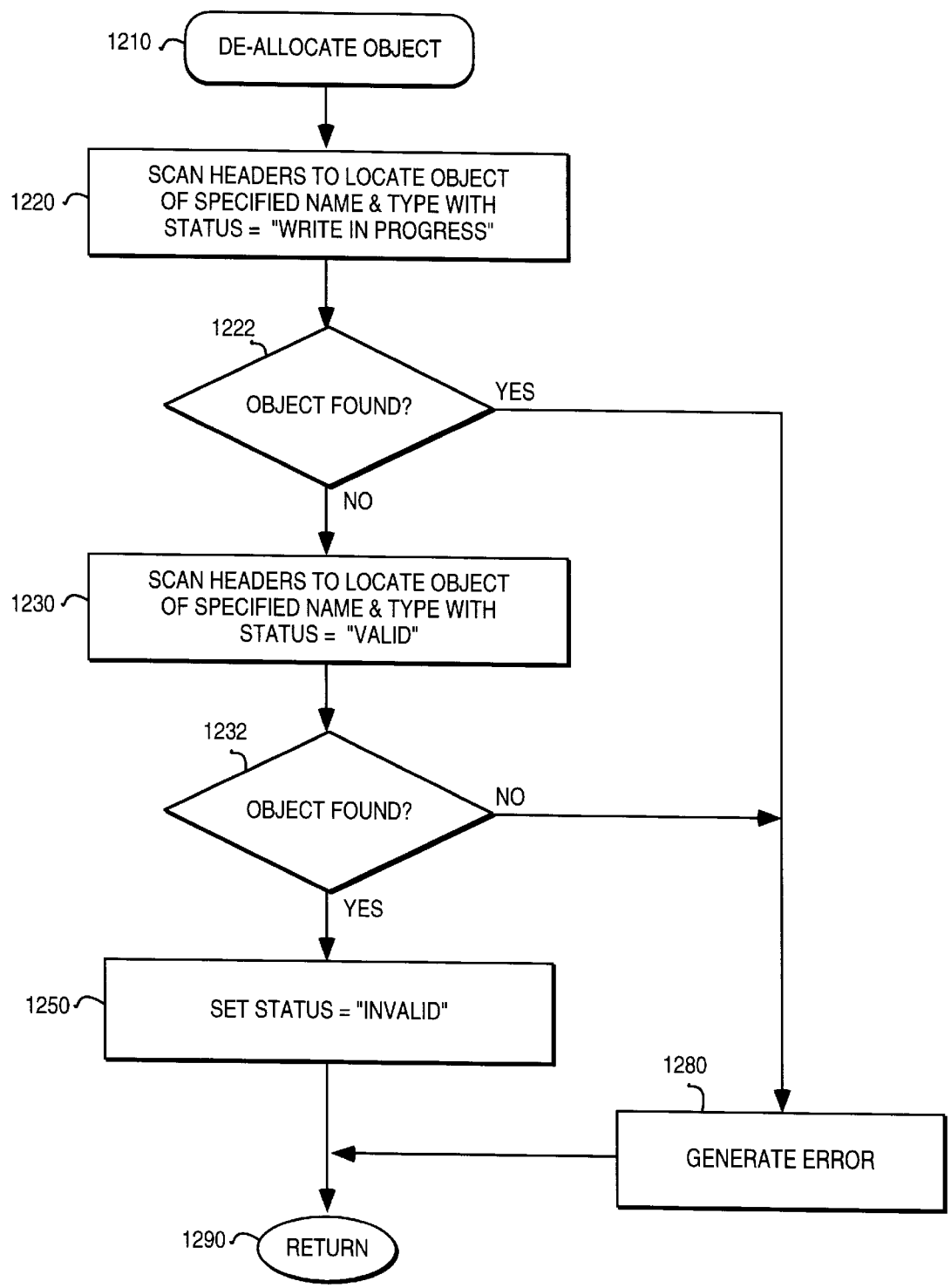
FIG. 12 illustrates a method for de-allocating an object.

FIG. 12 illustrates the de-allocation process beginning with step 1210. In one embodiment, objects that are being re-allocated are not eligible for de-allocation until the re-allocation process is complete. In addition, objects which have not been completely written (e.g., allocating Recovery Level 0 or 1 objects without calling Write Complete) cannot be de-allocated.

A request to de-allocate an object must identify the object by Name and Type. In step 1220, the headers are scanned to locate an object having the specified Name and Type with a status of "Write In Progress." Step 1222 determines if such an object is found. If an object having the specified Name and Type and status is found then an error is generated in step 1280 and de-allocation processing is completed in step 1290.

If step 1222 determines the object was not found processing continues with step 1230. In step 1230 the headers are scanned to locate an object having the specified Name and Type with a status of "Valid." Step 1232 determines if such an object is found. If an object having the specified Name and Type and status is not found then an error is generated in step 1280 and de-allocation processing is completed in step 1290.

If step 1232 determines the object was found processing continues in step 1250. In step 1250, the valid object identified by the specified Name and Type is de-allocated by setting the status of the associated header to "Invalid". De-allocation processing is then completed in step 1290.

Thus in one embodiment, objects are de-allocated only after locating a valid object of the specified Name and Type after 1) determining that the object is not being written and 2) determining that the object is not being re-allocated.

E. Re-allocation

FIGS. 13–17 illustrate the re-allocation process. Re-allocation is useful for updating an object which already exists within the managed object space. In one embodiment, an object is re-allocated into the same object space it was previously allocated into. In such a case, the re-allocation is referred to as static re-allocation.

Static re-allocation is the process of erasing the space previously allocated to an object. The header of the object being re-allocated is left intact. Thus after re-allocation, the space indicated by the header is available for reprogramming. An object can be updated in place by performing a static re-allocation operation as illustrated in FIGS. 13–17 followed by a write operation as illustrated in FIG. 9.

Figure 13:
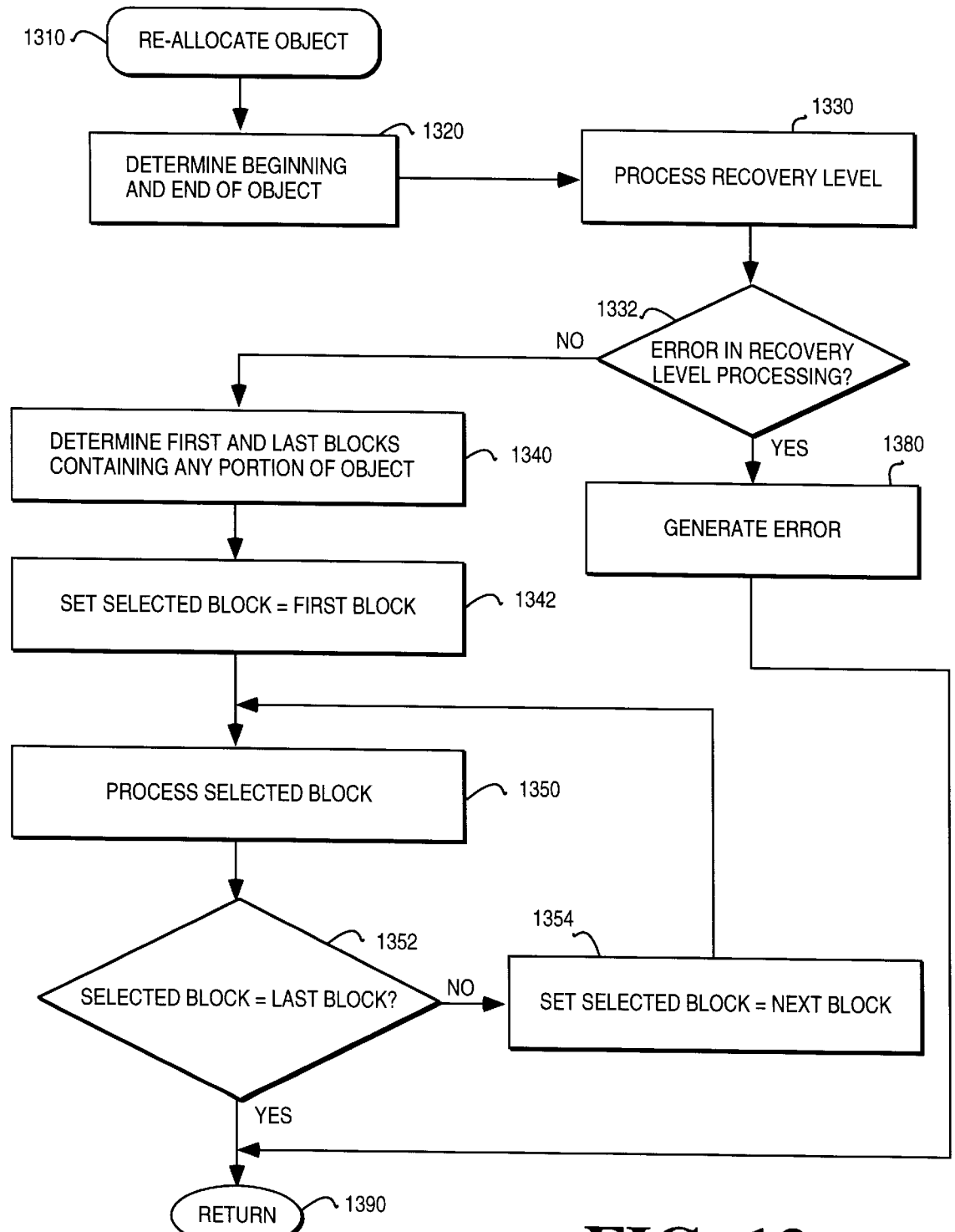
FIG. 13 illustrates a method for re-allocating an object.

FIG. 13 illustrates a flowchart for the re-allocation process beginning with step 1310. In step 1320, the beginning and the end of the object being re-allocated is determined. In other words, the boundaries of the object to be re-allocated are determined.

This can be accomplished for example by scanning the headers using Name and Type to locate a header identifying the object to be re-allocated. The header must indicate that the object is valid (i.e., Status="Valid"). This header is referred to as the re-allocated object header.

For a page object, an offset is computed by adding the header Size fields of all preceding "non-absorbed" page objects. "Non-absorbed" refers to the status of the header Absorbed bit which is described below with respect to reclamation. This offset indicates the offset of the beginning of the page object from the top of managed page space (i.e., the bottom of managed object space). The end of the re-allocated page object is then computed using the beginning location and the Size field from the re-allocated object header.

For a paragraph object, the end immediately follows the re-allocated object header, and is thus known. The beginning of the re-allocated page object is computed using the end location and the Size field from the re-allocated object header.

Figure 14:
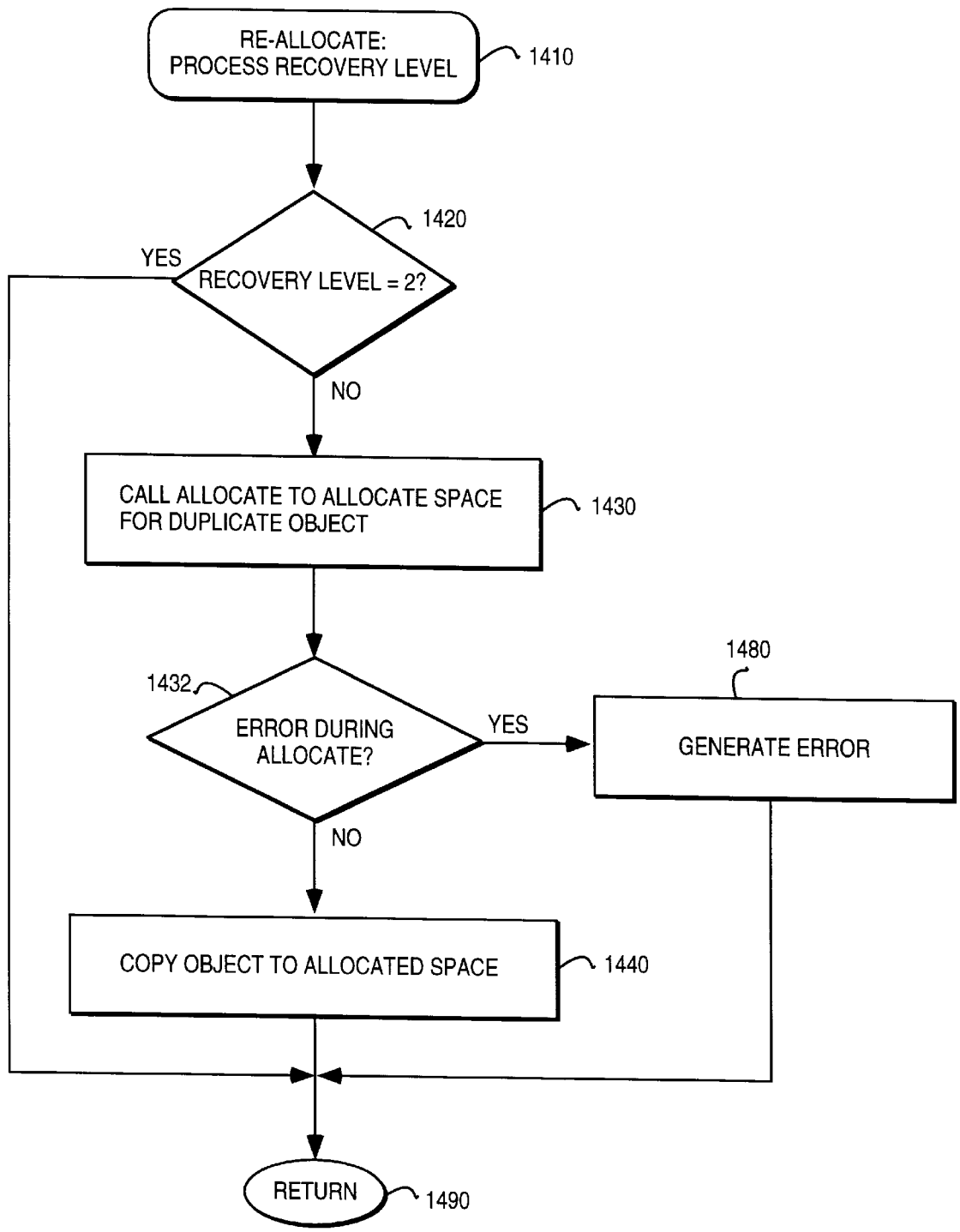
FIG. 14 illustrates recovery level processing during re-allocation.

Recovery Level processing is performed in step 1330 and is illustrated in further detail in FIG. 14 beginning at step 1410. Recovery Level 0 indicates that a copy of the object will be made before updating the current object. Recovery Level 1 indicates that a duplicate will be made if there is sufficient available space. Recovery Level 2 indicates that no duplication of the object will be performed. The object's Recovery Level is determined from the re-allocated object header.

Step 1420 determines if the Recovery Level=2. If so, then there is no need to make a copy of the object being re-allocated. Thus recovery level processing is completed by returning in step 1490.

If, however, the Recovery Level is not equal to 2, then a copy of the object must be made. A call is made to the allocate process in order to allocate space for a duplicate object in step 1430. The context of the call is re-allocate.

Step 1432 determines if an error occurred during the allocate process. If so, an error is generated in step 1480 and recovery level processing is completed in step 1490. Alternatively if no error occurred during the call to the allocate process, a copy of the object is written to the allocated space in step 1440. Recovery level processing is then completed in step 1490.

Referring to FIG. 13, the re-allocate object process continues with step 1332 after recovery level processing. Step 1332 determines if an error was generated during processing of the recovery level. If so, then an error is generated in step 1380 and the failed re-allocation is completed in step 1390. If no error was generated during processing of the recovery level, processing continues with step 1340.

Step 1340 determines the first and last blocks containing any portion of the object being re-allocated. Once the beginning and end locations or addresses have been determined (step 1320), the first and last blocks containing any portion of the object can be easily determined.

The first block can be determined, for example, by dividing the beginning by the block size. The integer value of the result is the first block. Thus the first block can be determined by performing the function INT(beginning/block size), where "INT(x)" returns the integer portion of value x. Similarly the last block containing any portion of the object can be determined as INT(end/block size). The beginning and end values might be adjusted by a constant K in some embodiments to account for a block ordering system that starts at a number other than 0 (e.g., 1). The same computation works for both paragraph and page objects. Thus the first and last blocks may be determined as follows:

$$\text{first block} = \text{INT}\left(\frac{\text{beginning}}{\text{block size}}\right) + K, \text{ and}$$

$$\text{last block} = \text{INT}\left(\frac{\text{end}}{\text{block size}}\right) + K.$$

Once the first and last blocks containing any portion of the object being re-allocated have been identified, a selected block variable is initialized to the first block in step 1342.

In step 1350, the block identified by the selected block variable is processed as discussed below with respect to FIG. 15. Step 1352 determines whether the selected block is the last block. If the selected block is not the last block, then the selected block variable is set to the next block in step 1354.

In one embodiment, step 1354 is accomplished by incrementing the selected block variable. In an alternative embodiment, step 1354 is accomplished by decrementing a selected block variable. Steps 1350, 1352, and 1354 are repeated until all blocks containing any portion of the object being re-allocated have been processed. This includes the first block, the last block, and any blocks between the first and last blocks.

Once all blocks containing any portion of the object being re-allocated have been processed as determined in step 1352, the re-allocation process has been completed and returns in step 1390.

Figure 15:
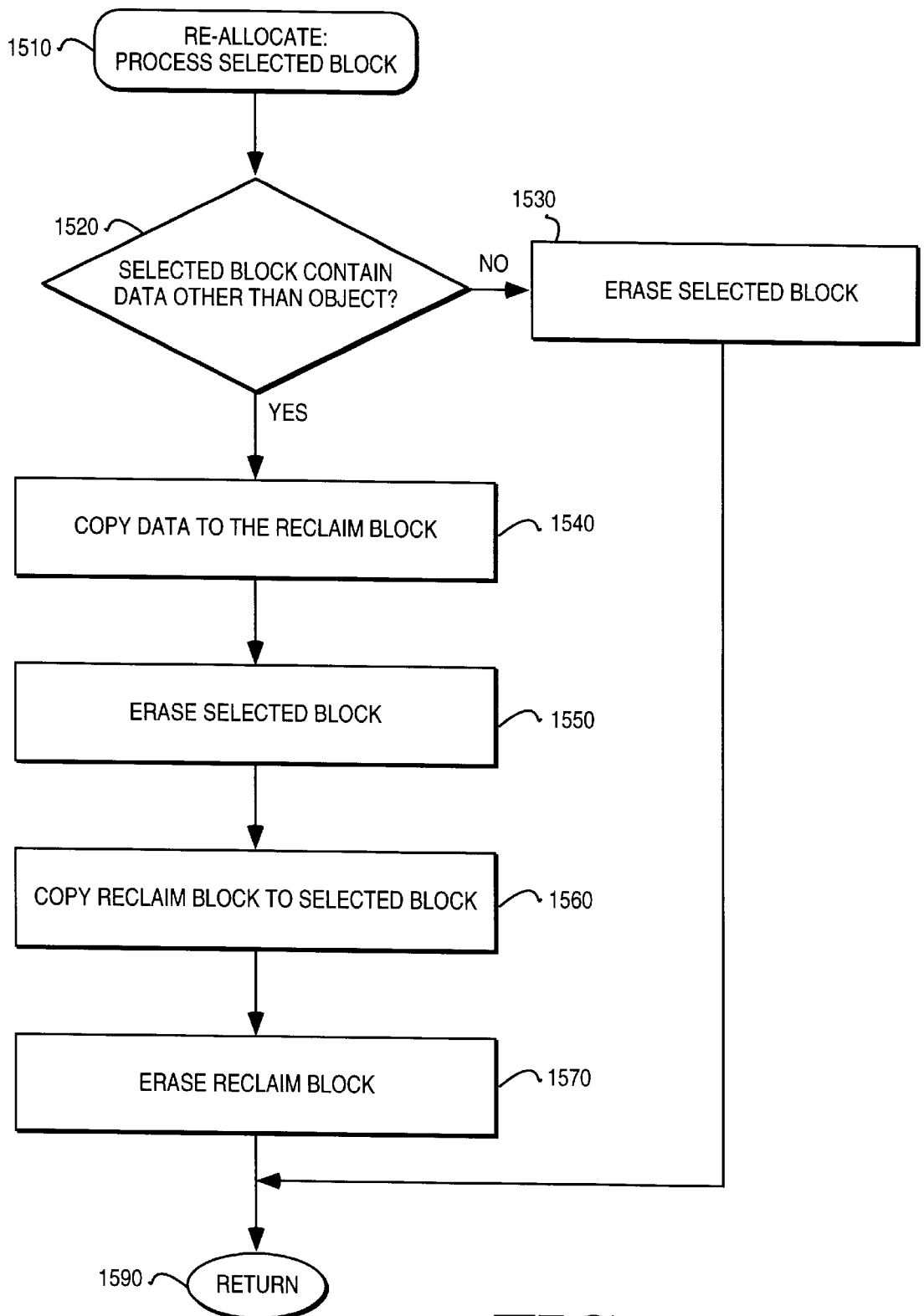
FIG. 15 illustrates processing of a selected block during re-allocation.

FIG. 15 provides greater detail on the processing of the selected block in step 1350 of FIG. 13. Processing of the selected block begins in step 1510.

Step 1520 determines whether the selected block contains data other than the object being re-allocated. If the object being re-allocated is not both block aligned and an integer number of blocks in size, then the first and last blocks may contain data not associated with the object being re-allocated. This data must be restored to its original location after a block erase so copies of the data must be made before erasing the blocks containing the object to be re-allocated.

Figure 16:
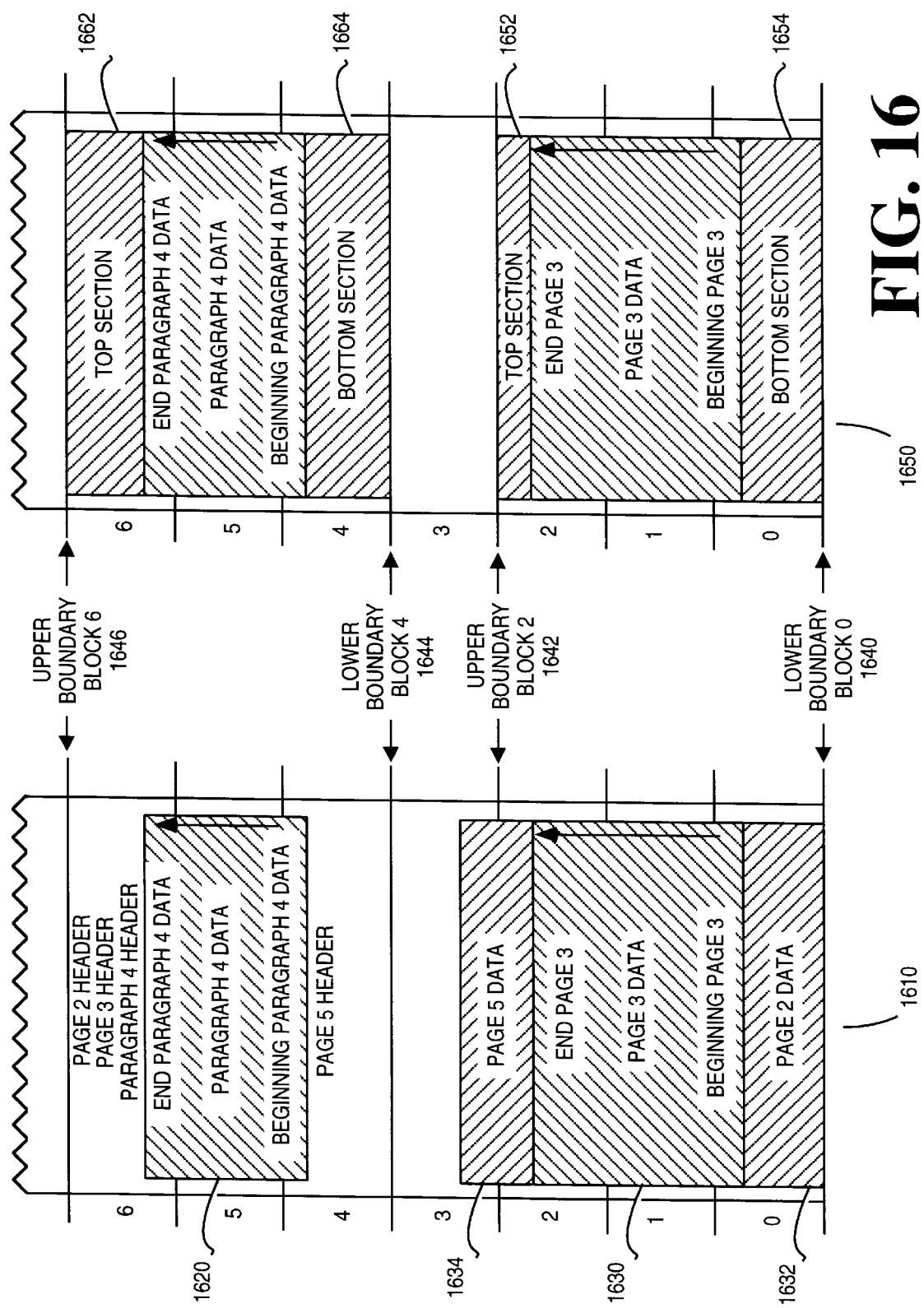
FIG. 16 illustrates the relationship of object boundaries and physical block boundaries.

FIG. 16 illustrates this point. Consider re-allocation of paragraph 4 (1620). Paragraph 4 (1620) spans a portion of block 4, all of block 5, and part of block 6 as illustrated within managed object space 1610.

In order to re-allocate paragraph 4, blocks 4, 5, and 6 must be erased. The first block (block 4) and the last block (block 6) contain data other than the object being re-allocated. This other data must be restored to blocks 4 and 6 after erasure.

Referring to managed object space 1650, any data between the beginning of paragraph 4 and the lower boundary of block 4 (1644) is referred to as the "bottom section" 1664. Thus if the beginning of paragraph 4 is not block aligned, there may be a bottom section within the first block that must be restored to the first block after erasure of the first block. Similarly, any data between the end of paragraph 4 and the upper boundary of block 6 (1646) is referred to as the "top section" 1662. Thus if the end of paragraph 4 is not block aligned, there may be a top section within the last block that must be restored to the last block after the last block is erased.

With respect to re-allocation of page 3 (1630), page 3 spans a portion of block 0, all of block 1, and a portion of block 2. In order to re-allocate page 3, blocks 0, 1, and 2 must be erased. The first block (block 0) and the last block (block 2) contain data other than the object being re-allocated. For example, block 0 also contains page 2 data (1632). Block 2 contains a portion of page 5 data (1634). This other data must be restored after erasure of blocks 0, 1, and 2.

Referring to managed object space 1650, any data between the beginning of page 3 and the lower boundary (1640) of block 0 is referred to as the "bottom section" 1654. Thus if the beginning of page 3 is not block aligned, there may be a bottom section within the first block that must be restored to the first block. Similarly, any data between the end of page 3 and the upper boundary (1642) of block 2 is referred to as the "top section" 1652. Thus if the end of page 3 is not block aligned, there may be a top section within the last block that must be restored to the last block.

Referring back to FIG. 15, if the selected block does not have any data other than the object being re-allocated, then the selected block is erased in step 1530. Processing of the selected block is then completed in step 1590.

If the selected block does contain data other than the object being re-allocated then the data is copied to the reclaim block (320) in step 1540.

The selected block is erased in step 1550. The contents of the reclaim block are copied to the selected block in step 1560 and the reclaim block is erased in step 1570. Thus steps 1520 through 1570 ensure that any data other than the object being re-allocated is restored to the block being processed. Once the other data has been restored, processing of the selected block is completed in step 1590.

Figure 17:
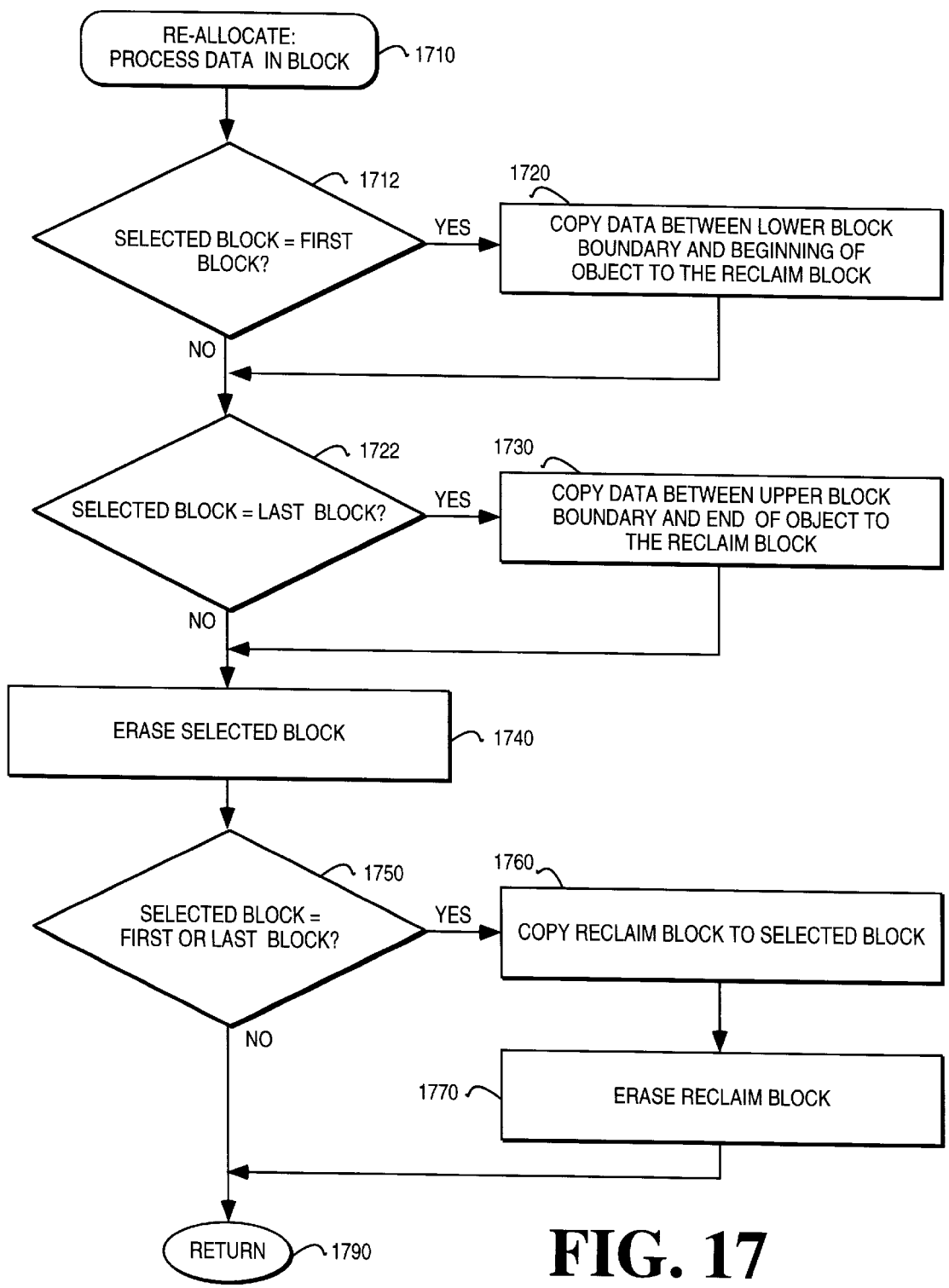
FIG. 17 illustrates another method for processing a selected block during re-allocation.

FIG. 17 illustrates an alternative to the method of FIG. 15 for the step of processing the selected block (1350) as set forth in FIG. 13. The alternative method of processing the selected block begins in step 1710.

Given that objects are stored contiguously in object space, only the first or last blocks can have data other than the object being re-allocated. Thus step 1712 determines whether the selected block is the first block. If so, then the bottom section (i.e., the data between the lower block boundary of the first block and beginning of the object) is copied to the reclaim block in step 1720. The bottom section is copied to the same location within the reclaim block as stored in the first block. Thus the bottom section is not repositioned within the reclaim block.

Depending upon whether the selected block was the first block, processing proceeds from either step 1712 or step 1720 to step 1722. Step 1722 determines whether the selected block is the last block. If so, then the top section (i.e., the data between the upper block boundary of the last block and the end of the object) is copied to the reclaim block in step 1730. The top section is copied to the same location within the reclaim block as stored in the last block. Thus the top section is not repositioned within the reclaim block.

Depending upon whether the selected block was the last block, processing proceeds from either step 1722 or step 1730 to step 1740. In step 1740, the selected block is erased. Processing then continues with step 1750 to restore data residing in the reclaim block, if necessary.

Step 1750 determines whether the selected block is the first block or the last block. If not, then processing of the selected block is completed in step 1790. If so, then the reclaim block is copied to the selected block in step 1760. The reclaim block is then erased in step 1770. Processing of the selected block is then completed in step 1790.

Once space has been re-allocated for Recovery Level 0 or 1 objects, a copy of the object as it existed before re-allocation may reside in managed object space. Once the new version of the object has been written to the re-allocated space, the Write Complete process should be performed to invalidate the prior version of the object.

FIGS. 13 through 17 thus illustrate a method for re-allocating object space for an object stored within a block erasable nonvolatile memory. In particular, a beginning and an end of the object are determined. The beginning and the end effectively identify every block storing at least a portion of the object including a first block and a last block. Each selected block storing any portion of the object is processed. A bottom portion of the selected block (i.e., the area bound by the lower boundary of the first block and the beginning of the object) is copied to a reclaim block if the selected block is the first block. A top portion of the selected block (i.e., the area bound by the upper boundary of the last block and the end of the object) is copied to the reclaim block if the selected block is the last block. The selected block is erased. Finally, the reclaim block is copied to the selected block, if the selected block is one of the first and last blocks.

F. Reclamation

Reclamation is the process of freeing up memory associated with de-allocated objects. This requires erasing the space associated with de-allocated objects. Referring to the values for the header Status field (506), the space identified as bad or invalid is typically referred to as "dirty" space. In one embodiment, reclamation is performed automatically when a reclamation threshold is reached.

FIGS. 18–21 illustrate the reclamation process beginning with step 1810. In step 1820 space is allocated for a reclaim marker. The reclaim marker serves to mark the bottom of allocated space. The location of the reclaim marker varies in accordance with the class of space being reclaimed. Thus if page reclamation has been initiated, a reclaim marker header is stored in paragraph space and the reclaim marker is allocated at the bottom of allocated page space. The reclaim marker is stored immediately after the reclaim marker header if paragraph reclamation has been initiated.

Reclamation effectively compacts object space. As the space used by de-allocated objects is made available, subsequent objects of the same class are moved towards the top of that class of object space to maintain contiguity.

Step 1830 determines the first block requiring a reclaim. This can be accomplished by scanning headers to locate the first invalid object. As described with respect to the re-allocate process, the beginning of the space allocated to that object determines the first block that must be reclaimed. The beginning is block aligned towards the top of the class of object space being reclaimed.

Step 1840 identifies the current block being reclaimed as the first block calculated in step 1830.

The last block to be reclaimed is the block containing the reclaim marker. Step 1850 processes consecutive blocks beginning with the first block and finishing with the block containing the reclaim marker. As de-allocated space is made available, valid objects subsequent to the de-allocated space are moved towards the top of the class of object space being reclaimed in order to maintain contiguity. Thus valid page objects are compacted toward the top of page space and valid paragraph objects are compacted toward the top of paragraph space. The reclamation process is then completed in step 1890.

Figure 18:
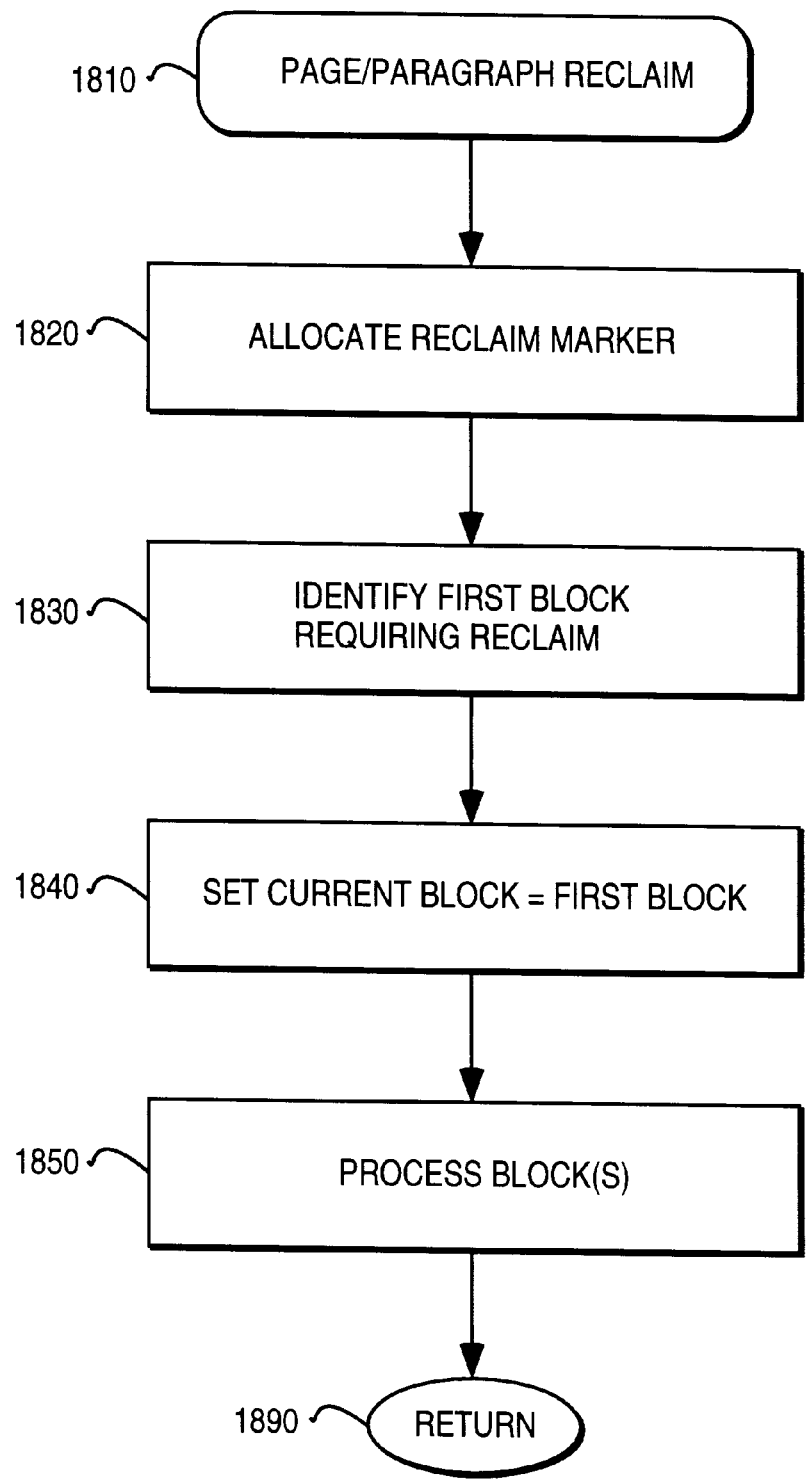
FIG. 18 illustrates the reclamation process.
Figure 19:
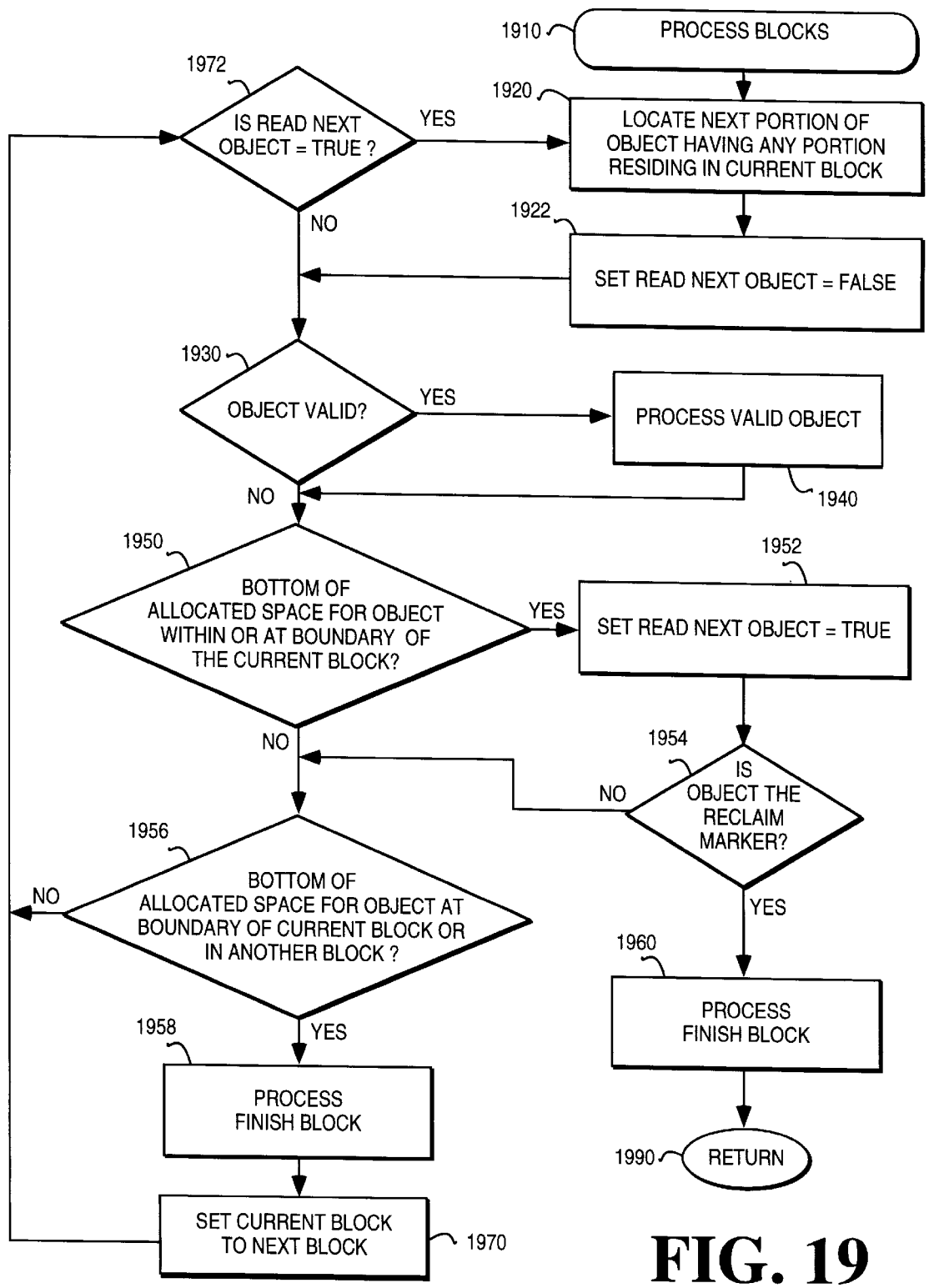
FIG. 19 illustrates a method for processing blocks during reclamation.

FIG. 19 provides greater detail of the process blocks (1850) step of FIG. 18 beginning with step 1910. Step 1920 locates the next portion of an object having any portion residing in the current block. A Read Next Object variable is set to False in step 1922.

Step 1930 determines whether the object is valid. If so, the valid object is processed in step 1940. Otherwise tests are conducted to determine whether there are more objects within this block in step 1950. If the allocated space for the object is within the current block or at the block boundary of the current block, then processing of the object is complete. Step 1952 sets the Read Next Object variable to True to indicate that another object is to be read.

Step 1954 determines if the object is the reclaim marker. If so then the last block is being processed and there are no other objects to be compacted. Step 1960 is performed to finish processing the last block. Processing of all the blocks is then completed in 1990.

If step 1954 determines the object is not the reclaim marker, then a test is conducted to determine if processing of the current block is completed. Step 1956 determines if the bottom of the space allocated for the current object is either at the boundary of the current block or in another block. Processing of valid objects in the current block is finished if either of these conditions has been met. Step 1958 performs the necessary process of erasing the current block.

After step 1958, step 1970 sets the current block to the next block. In one embodiment this is accomplished by incrementing or decrementing a value corresponding to the current block. Within a given object space, reclamation proceeds from the top of that class of object space and proceeds to the bottom of that class of object space. Referring to FIG. 16, advancing to the next block can be accomplished by decrementing during a paragraph reclaim and by incrementing during a page reclaim. The implementation of step 1970 is dependent upon the block identification scheme and the orientation of the classes of object space within the managed object space.

Step 1972 determines if the Read Next Object variable is True. If so, then processing of the object is complete and processing continues with step 1920 to locate the next portion of object having any portion residing in the current block.

If an object spans more than one block then processing of that object continues in step 1930. If the object is valid, processing continues with step 1940 to process that portion of the object stored in the current block.

Figure 20:
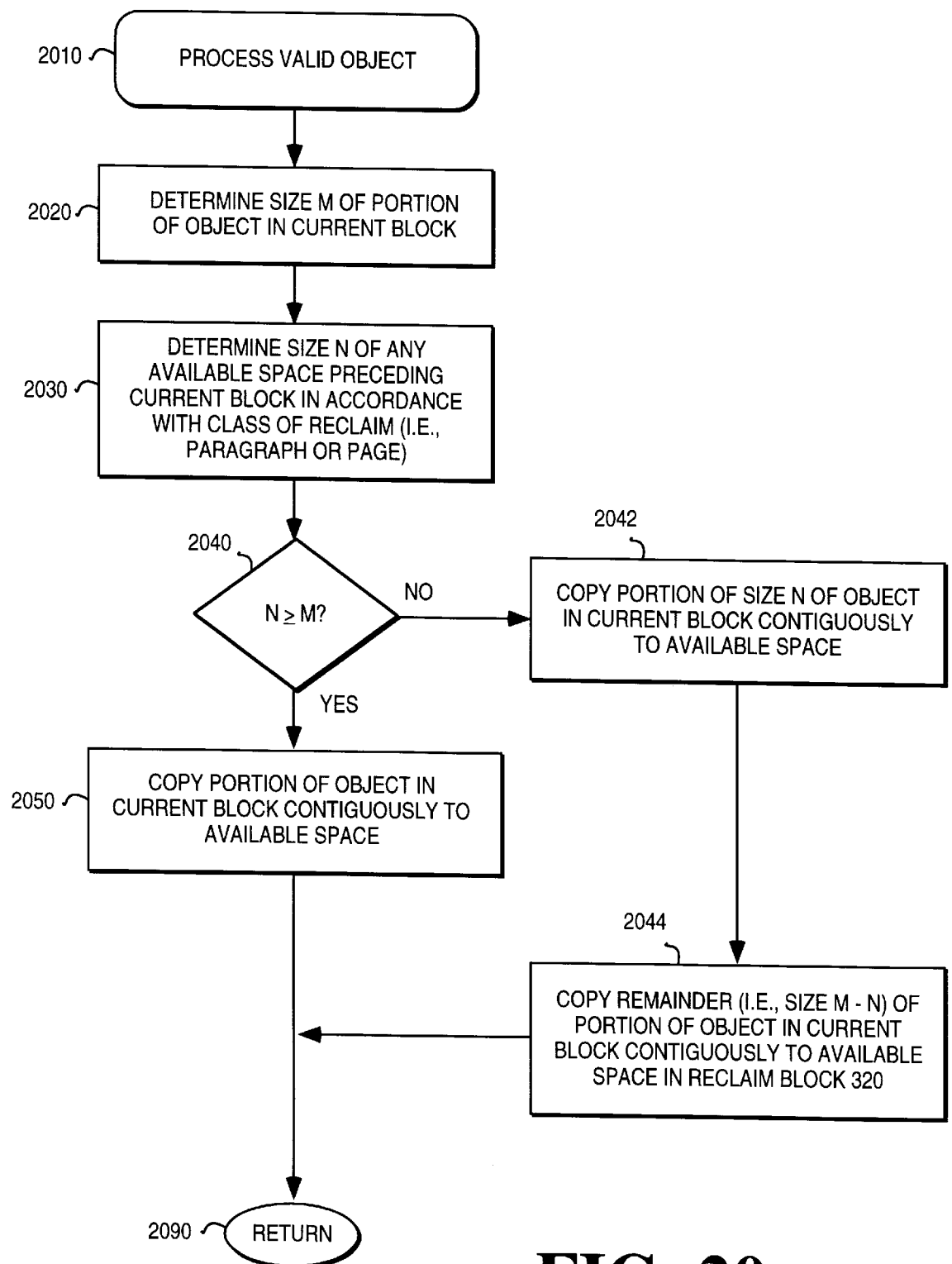
FIG. 20 illustrates a method for compacting valid objects within a block into available space during reclamation.

FIG. 20 illustrates processing of a valid object from step 1940 of FIG. 19 in greater detail beginning with step 2010.

The size M of the portion of the object in the current block is determined in step 2020. Step 2030 determines the size N of any available space preceding the current block in accordance with the class of reclaim. For the arrangement illustrated in FIG. 16, "preceding" refers to blocks having block numbers lower than the current block during a page reclaim. Conversely, "preceding" refers to blocks having block numbers higher than the current block during a paragraph reclaim.

Step 2040 determines if the amount of available space N is greater than or equal to M, wherein M represents the amount of space required to store the entire portion of the object from the current block.

If N≧M, then the portion of the object in the current block is contiguously copied to the available space in step 2050. Processing of the valid object is then complete in step 2090.

If N<M, then as much of the portion of the valid object within the current block as possible is copied to the available space. Thus step 2042 copies a portion of size N of the object from the current block to the available space. The remainder of the object (size M−N) is then copied contiguously to available space within reclaim block 320 in step 2044. Processing of the valid object returns in step 2090.

Figure 21:
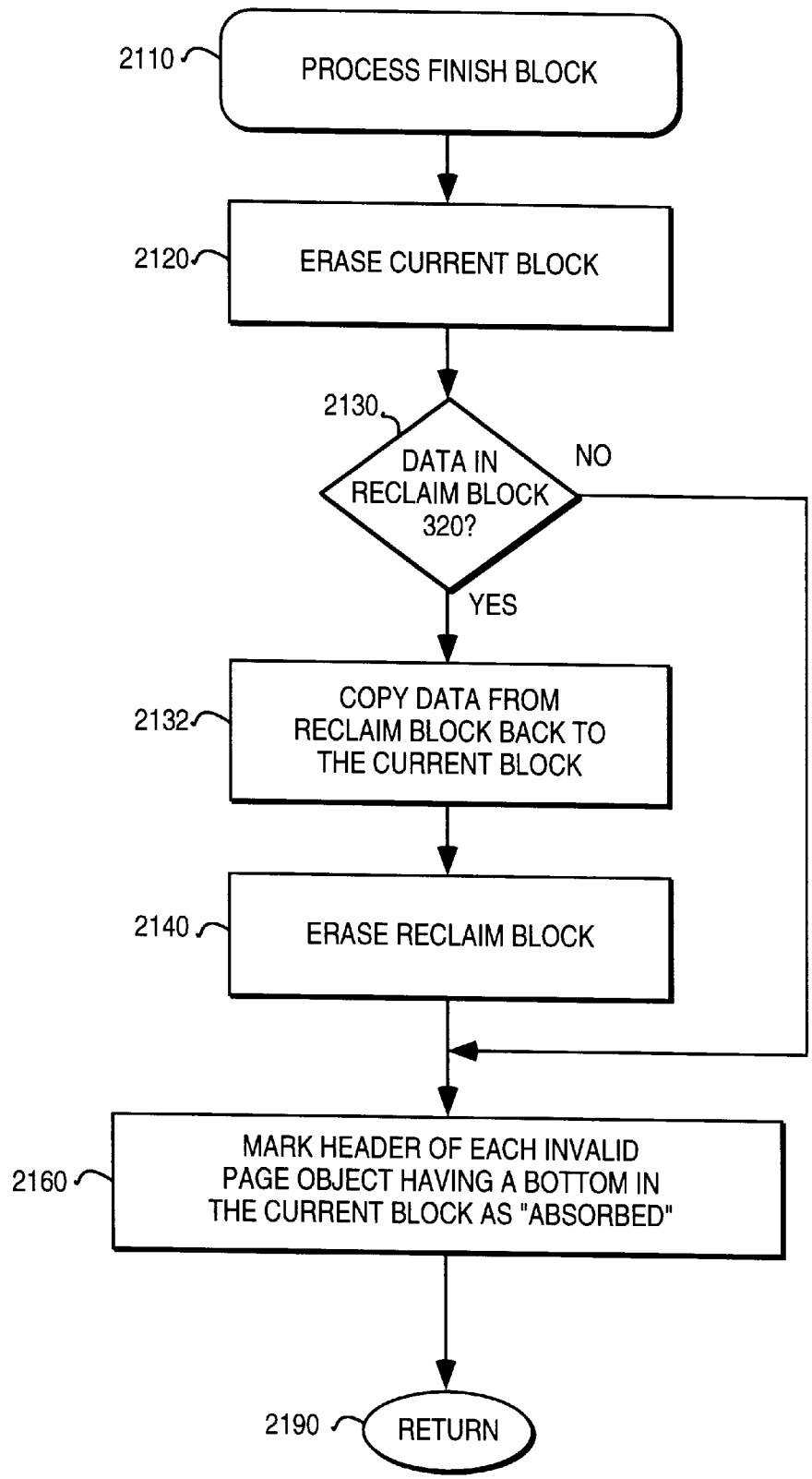
FIG. 21 illustrates a method for completing reclamation of a given block.

FIG. 21 illustrates steps 1958 and 1960 of FIG. 19 in greater detail. Finish block processing begins in step 2110. The current block is erased in step 2120. If step 2130 determines that any data is in reclaim block 320 then the data is copied to the current block in step 2132. (Data is placed in the reclaim block during step 2044 of FIG. 20). The reclaim block is then erased in step 2140.

Processing continues from either step 2130 or 2140 to step 2160. Page and paragraph reclamation are independent operations. Given that the headers for page objects are stored in paragraph space, the space used by page headers for de-allocated page objects cannot be recovered during a page reclamation even though the page objects indicated by the de-allocated page headers no longer exist. The allocated space indicated by the header is no longer correct.

Step 2160 marks any headers indicating an invalid object having a bottom in the current block as "absorbed." This accomplished by programming the Absorbed bit (504) in the corresponding headers. The Absorbed bit indicates that the space indicated by the header is no longer allocated and should not be used when locating objects. Thus for example the "allocated" space designated by page headers for de-allocated page objects is not used when calculating page object locations if the header also indicates that the page object was absorbed.

Once any necessary updating of the page headers is accomplished, processing of the current block is completed in step 2190.

IV. CONCLUSION

Allocation, writing, reading, de-allocation, re-allocation, and reclamation processes are provided for a method of managing a symmetrically blocked nonvolatile memory having a bifurcated storage architecture.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

APPENDIX I

The following terms and definitions refer to the header data structure illustrated in FIG. 5:

HeaderID 502—a paragraph-aligned field used to distinguish headers from other objects stored within the paragraph object space.

Attributes 540—a byte aligned field. Attributes is a two byte field comprised of a number of other fields including Absorbed 504, Status 506, FixedHeaderComplete 508, RFU 510, Privilege 512, Alignment 514, Reserves 516, Confidence 518, and Size16_19 520.

Absorbed 504—is a one bit field that indicates that an object has been reclaimed and thus no longer resides in memory.

FixedHeaderComplete 508—is used during the allocation process to ensure creation of the fixed portion of the header (i.e., the non-Name fields) have been written.

Status 506—indicates whether the object is valid, invalid, being written, or bad.

Privilege 512—indicates privilege levels used by a typical memory management unit (MMU). Privilege 512 is used to validate the accessibility of the object. For example, this field may be used to define whether an object is modifiable by a user process or only by an operating system process.

Alignment 514—defines the allocation granularity and alignment of the object identified by the header. This field effectively identifies the class of the object. Thus Alignment indicates whether the object is a paragraph or a page object and thus whether the object is aligned on paragraph boundaries or page boundaries.

Reserves 516—is used in conjunction with Confidence 518. Reserves 516 indicates that space should be reserved during initial allocation to ensure the ability to perform a re-allocation.

Confidence 518—indicates whether a duplicate of the original object should created during a re-allocation. Confidence 518 is used in conjunction with Reserves 516 to define an object's Recovery Level.

Size0_15 (530), Size 16_19 (520)—The size of the object identified by the header is indicated by fields 530 (Size0_15) and 520 (Size16_19). When concatenated, fields 530 and 520 form a 20 bit field describing the size of the stored object in allocation units (i.e., either paragraphs or pages). A value of n represents n*4K allocated memory for a page object or n*16 bytes for a paragraph object. Thus in the embodiment illustrated, the maximum size permitted is four gigabytes for a page object or sixty-four megabytes for a paragraph objects. Size0_15 and Size 16_19 are collectively referred to as the Size field.

Name Size 532—indicates the size of the name stored within Name 550. In the embodiment illustrated, Name Size is 1 byte thus allowing for a 255 byte value stored in Name 550 (a 0 byte length Name is permitted, thus the maximum length is limited 255 bytes) In an alternative embodiment, a terminator such as NULL is used to indicate the end of the stored name thus eliminating the need for the Name Size 532 field.

Type 534 is used to define a type or category for the stored object. For example, the type for BIOS might be "BIOS." Generally, type may have any value, however, some values are specifically reserved for use by FMM. In one embodiment, Type 534 is a four byte field.

Security Key 536 is reserved for use as a software based security key that can be used to validate the accessibility of the object. FMM does not use this key. Security Key 502 is provided for program developers to use as may be desired. In one embodiment, Security Key 502 is a four byte field.

Name 550 is used to store the name of the object. Name 550 is a paragraph-aligned field. In the embodiment illustrated, the length of the name may be 255 bytes. Name 550 and Type 534 are used to uniquely identify objects within the managed object space.

What is claimed is:

1. A method of storing an object within a managed object space of a nonvolatile memory, comprising the steps of:

determining an object class for the object, wherein objects of a first class are stored contiguously proceeding from a first end towards a second end of managed object space to form a first class of space, wherein objects of a second class are stored contiguously proceeding from the second end towards the first end of managed object space to form a second class of space;

storing a header identifying the object at a bottom of the first class of space; and storing the object at a selected one of the bottom of the first class of space and a bottom of the second class of space in accordance with the object class.

2. The method of claim 1 wherein the nonvolatile memory is a flash memory.

3. The method of claim 1 wherein the nonvolatile memory is symmetrically blocked.

4. The method of claim 1 wherein the nonvolatile memory is a boot device.

5. A method of writing an object into an allocated space within a managed object space of a nonvolatile memory, comprising the steps of:

a) locating a header associated with the object within the managed object space, wherein objects are allocated within the nonvolatile memory in accordance with an object class, wherein objects of a first class including headers are allocated contiguously proceeding from a first end towards a second end of managed memory space to form a first class of object space, wherein objects of a second class are allocated contiguously proceeding from the second end towards the first end of managed object space to form a second class of object space;

b) setting a status of the header to a first value;

c) locating the allocated space for the object;

d) writing the object to the allocated space; and e) setting the status of the header to a second value.

6. The method of claim 5 wherein the nonvolatile memory is a flash nonvolatile memory.

7. The method of claim 5, wherein step c) further comprises the steps of:

i) determining a size, n, of the allocated space from the header, if the object is of the first class of objects; and ii) identifying the location of the allocated space as an area of size n bound by the header.

8. The method of claim 5 wherein step c) further comprises the steps of:

i) calculating a total space allocated to preceding objects of the same class as the object, if the object is of the second class; and ii) identifying a location of the allocated space as an area of a size determined from the header bound by an offset from the bottom of managed object space, wherein the offset equals the total space.

9. A method of reading an object from an allocated space within a managed object space of a nonvolatile memory, comprising the steps of:

a) locating a header associated with the object within the managed object space, wherein objects are allocated within the nonvolatile memory in accordance with an object class, wherein objects of a first class including headers are allocated contiguously proceeding from a first end towards a second end of managed memory space to form a first class of object space, wherein objects of a second class are allocated contiguously proceeding from the second end towards the first end of managed object space to form a second class of object space;

b) determining a location the object; and c) reading the object from space allocated to one of the first and second classes in accordance with the location.

10. The method of claim 9 wherein the nonvolatile memory is a flash memory.

11. The method of claim 9, wherein step b) further comprises the steps of:

i) determining a size, n, of the allocated space from the header, if the object is of the first class of objects; and ii) identifying the location of the allocated space as an area of size n bound by the header.

12. The method of claim 9 wherein step b) further comprises the steps of:

i) calculating the total space allocated to preceding objects of the same class as the object, if the object is of the second class; and ii) identifying a location of the allocated space as an area of a size determined from the header bound by an offset from the bottom of managed object space, wherein the offset equals the total space.

* * * * *